(12) United States Patent
Takahashi

(10) Patent No.: US 8,805,447 B2
(45) Date of Patent: Aug. 12, 2014

(54) BASE STATION, MOBILE COMMUNICATION SYSTEM AND RADIO SIGNAL QUALITY MEASUREMENT METHOD

(75) Inventor: Mamoru Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 13/484,445

(22) Filed: May 31, 2012

(65) Prior Publication Data

US 2012/0238311 A1 Sep. 20, 2012

Related U.S. Application Data

(63) Continuation of application No. PCT/JP2009/070247, filed on Dec. 2, 2009.

(51) Int. Cl.
*H04B 7/00* (2006.01)
*H04B 1/38* (2006.01)
*H04W 52/24* (2009.01)

(52) U.S. Cl.
CPC .................................. *H04W 52/243* (2013.01)
USPC .......................................... 455/561; 455/522

(58) Field of Classification Search
CPC . H04W 52/243; H04W 52/245; H04W 52/26; H04W 52/241; H04W 52/265; H04W 52/267
USPC ................................................ 455/522, 561
See application file for complete search history.

(56) References Cited

U.S. PATENT DOCUMENTS

| 2002/0159514 | A1* | 10/2002 | Miyoshi et al. | 375/226 |
|---|---|---|---|---|
| 2004/0092233 | A1* | 5/2004 | Rudrapatna | 455/69 |
| 2005/0085255 | A1* | 4/2005 | Andersson et al. | 455/522 |
| 2006/0002338 | A1* | 1/2006 | Guo | 370/328 |
| 2006/0205396 | A1* | 9/2006 | Laroia et al. | 455/422.1 |
| 2009/0005049 | A1* | 1/2009 | Nishio et al. | 455/442 |
| 2010/0238818 | A1* | 9/2010 | Takaoka et al. | 370/252 |
| 2011/0223964 | A1* | 9/2011 | Ebiko | 455/522 |
| 2012/0108180 | A1* | 5/2012 | Shibuya | 455/67.13 |
| 2014/0079027 | A1* | 3/2014 | Haim | 370/335 |

FOREIGN PATENT DOCUMENTS

| JP | 2001-197017 | 7/2001 |
|---|---|---|
| JP | 2004-64130 | 2/2004 |
| JP | 2005-167710 | 6/2005 |
| WO | 2009/047910 | 4/2009 |

OTHER PUBLICATIONS

International Search Report dated Feb. 2, 2010, from corresponding International Application No. PCT/JP2009/070247.

* cited by examiner

*Primary Examiner* — Simon Nguyen
(74) *Attorney, Agent, or Firm* — Katten Muchin Rosenman LLP

(57) ABSTRACT

A base station includes a received signal power measurement unit that calculates a radio signal power of a radio signal received from a mobile station which is connected by radio connection, a measurement period decision unit that decides a measurement period based on a first index representing a transmission rate of received data transmitted from the mobile station and one of a second index representing a resource assigned to the mobile station and a third index representing an amount of data buffered in the mobile station and to be transmitted, an interference power measurement unit that calculates an interference power over the measurement period, a received signal quality measurement unit that calculates signal quality of the radio signal based on the radio signal power and the interference power and a transmission power decision unit that decides a transmission power control value to the mobile station based on the signal quality.

11 Claims, 16 Drawing Sheets

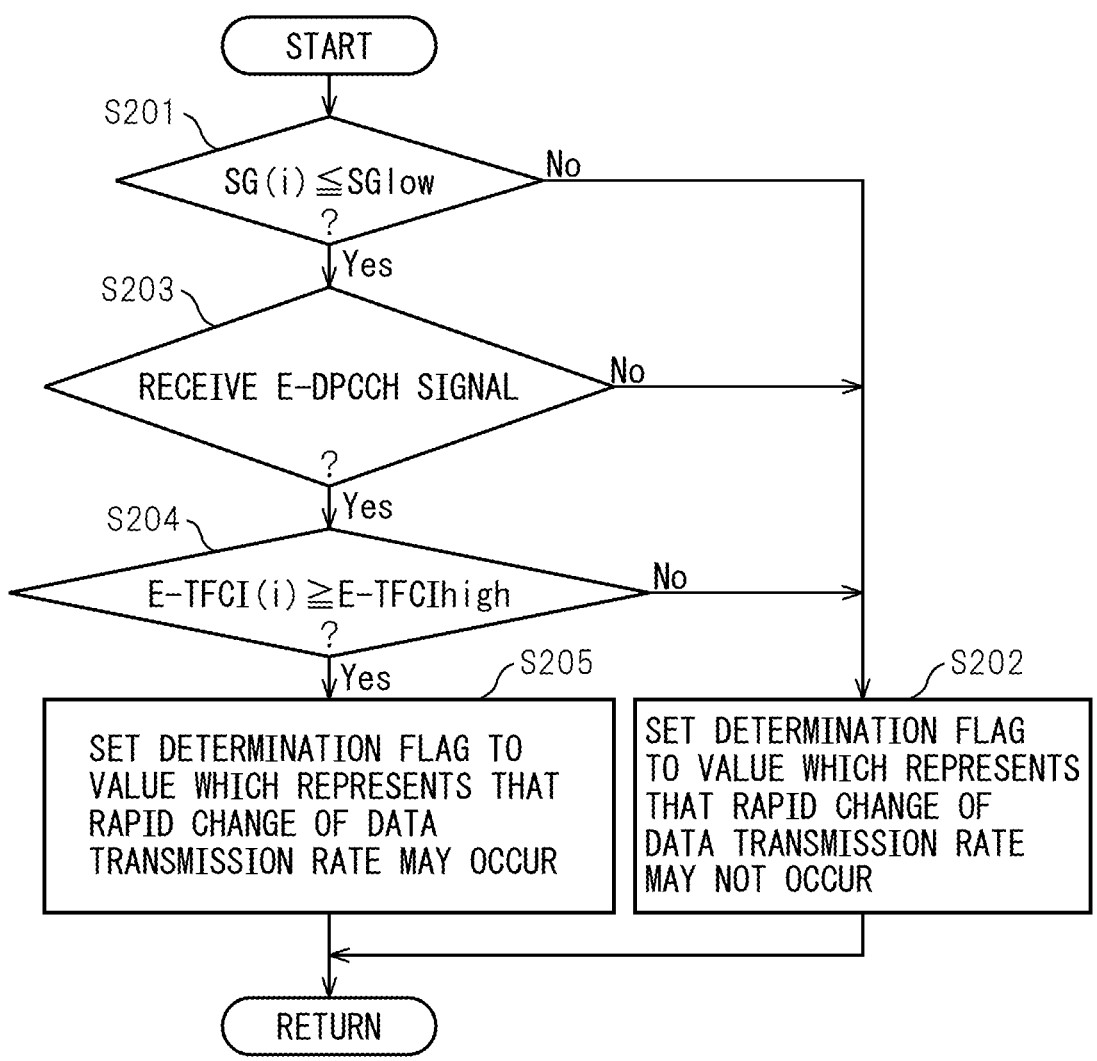

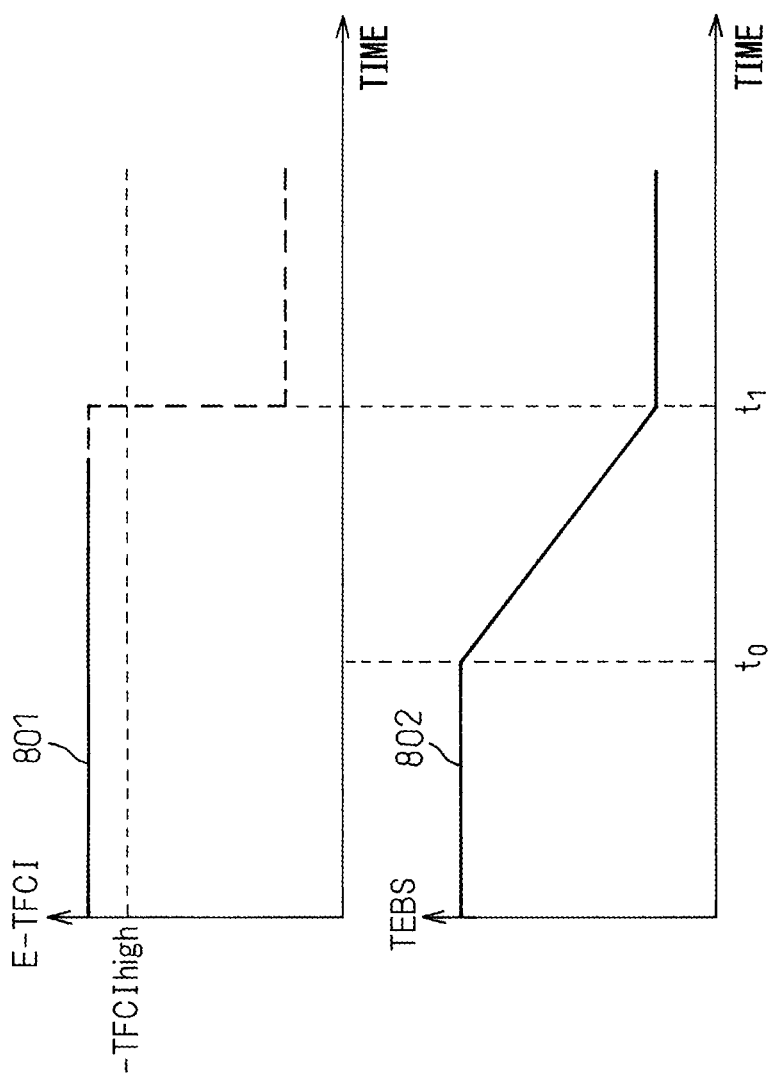

BASE STATION, MOBILE COMMUNICATION SYSTEM AND RADIO SIGNAL QUALITY MEASUREMENT METHOD

CROSS-REFERENCE TO RELATED APPLICATION

This application is a continuation application and is based upon PCT/JP2009/070247, filed on Dec. 2, 2009, the entire contents of which are incorporated herein by reference.

FIELD

The present invention relates to a base station, a mobile communication system and a radio signal quality measurement method.

BACKGROUND

In a mobile communication system, a base station and a mobile station can both measure quality of received radio signal, so that the radio signal received from an apparatus of a wireless connection destination can be appropriately reproduced. Then, the base station and the mobile station can determine a transmission power control (TPC) value used as an index for determining transmission power of a radio signal according to the measured quality, and transmit the TPC value to the apparatus at the wireless connection destination.

The base station and the mobile station measure, for example, a signal-to-interference ratio (SIR) to determine the quality of the received radio signal.

For example, in cases where a code division multiplexing access (CDMA) is adopted as a multiplex system, a base station detects pilot symbols by applying a despreading operation to the received radio signal. The base station performs channel estimation using the detected pilot symbols, and then performs Rake combination. Then, after performing the Rake combination, the base station measures a receiving power of a pilot symbol period in an uplink-dedicated physical control channel (UL-DPCCH) and a power of interference signals. The base station acquires an SIR estimation value by dividing the received power of the Pilot symbol period by the power of the interference signals. Then, the base station compares the SIR estimation value with an SIR target value and determines a TPC bit value based on the comparison result. The base station transmits an uplink TPC bit value to the mobile station over a downlink-dedicated physical control channel (DL-DPCCH). Inner loop power control is realized by these operations.

Conventionally, a base station and mobile station automatically control gain (AGC) of the radio signal so that the radio signal received through an antenna can be reproduced. Therefore, the power value of the received signal and the power value of the interference signal, which are used to calculate the SIR estimation value in the base station, are relative to a total power value of the radio signal received by the base station. Thus, a change in the total power value of the radio signal received by the base station causes the power value of the received signal and the power value of the interference signals to change. For example, when the total power value of the radio signal received by the base station increases, each of the power values of the received signal from each mobile station and the power value of the interference signals relatively decrease.

The power value of the interference signal is measured by averaging signal distribution values of the pilot symbols in respective time slots over a plurality of slots. In order to estimate the power value of the interference signals correctly, the length of the period used for the averaging is set, for example, as a length corresponding to a plurality of frames, such as ten frames. However, a case may occur where the total received power in the base station is rapidly changed due to a change in the number of the mobile station connected with the base station in a same cell. In such case where the rapid change of the total received power occurs, the power value of the interference signals may be unable to follow the rapid change of the total received power since the power value of the interference signals is an average value of the values measured over a certain period as described above. Therefore, an error between the SIR estimation value and the actual value of SIR may become large, and as a result, there is a possibility that the mobile communication system may not perform normal transmission power control.

Techniques for adjusting the length of the period for calculating the estimate value of the interference signals according to the change of the power value of the received signal have been developed (refer to Japanese Laid-open Patent Publication No. 2001-197017 and Japanese Laid-open Patent Publication No. 2005-167710, for example).

For example, in such known techniques, while the apparatus for measuring the SIR detects desired wave power by the received signal, the apparatus detects interference wave power from the received signal. The apparatus applies an averaging process of earlier and later interference wave power detection values over a long period slot and an averaging process thereof over a short period slot. Furthermore, the apparatus obtains a difference of the two average values, thereby detecting an amount of the change of the interference wave power. The apparatus selects the average value over the short period in cases where the detected amount of the change of the interference wave power is large, and selects the average value over the long period in cases where the detected amount of the change of the interference wave power is small. Then, the apparatus obtains a ratio of the selected average value and the desired wave power.

According to another example of a known technique, a calculator for instantaneous interference wave power calculates a spread value of reverse modulation symbols in a predetermined period, and outputs the value as an instantaneous interference wave power value. Moreover, a calculator for the number of averaging interference wave power calculates a number of averaging interference wave power, which is short if the amount of interference wave power change calculated by a calculator for the amount of interference wave power change is more than a threshold, and calculates a number of averaging interference wave power, which is long if it is less than a threshold. An interference wave power averaging device performs an averaging process to the number of the instantaneous interference wave power values corresponding to the number of averaging interference wave power, and outputs the averaged value as an interference wave power value. Moreover, the calculator for the number of averaging interference wave power calculates the number of averaging interference wave power according to an estimate value of propagation channel environment. The estimate value of propagation channel environment is calculated based on any of the amount of phasing change, the amount of other cell interference, the number of multipasses and the number of other cell paths, or combinations thereof.

SUMMARY

In the above-described known techniques, the apparatus which receives the radio signal calculates information for estimating whether or not the interference signal power may be changed, based on the received radio signal. Therefore, the apparatus receiving the radio signal may not adjust the measurement period for averaging the interference signal until a power change actually occurs. Thus, according to the conventional techniques, a case may occur where the apparatus receiving the radio signal, is subject to a rapid power change and may not adjust the length of the measurement period of the interference signal appropriately, and may be unable to reduce the difference amount between the estimate value and the actual value of SIR.

According to one embodiment, a base station is provided. The base station includes: a received signal power measurement unit that calculates a radio signal power of a radio signal received from a mobile station which is connected by radio connection; a measurement period decision unit that decides a measurement period which is to be used for calculating an interference power based on a first index representing a transmission rate of received data transmitted from the mobile station and one of a second index representing a resource assigned to the mobile station and a third index representing an amount of data buffered in the mobile station and to be transmitted; an interference power measurement unit that calculates an interference power over the decided measurement period; a received signal quality measurement unit that calculates signal quality of the radio signal received from the mobile station based on the radio signal power and the interference power; and a transmission power decision unit that decides a transmission power control value to the mobile station based on the signal quality.

According to another embodiment, a mobile communication system including a mobile station and a base station is provided. In the mobile communication system, the base station includes: a received signal power measurement unit that calculates a radio signal power of a radio signal received from the mobile station which is connected by radio connection; a measurement period decision unit that determines whether or not a transmission rate change of the data transmitted from the mobile station is expected to occur based on a first index representing a transmission rate of received data transmitted from the mobile station and, one of a second index representing a resource assigned to the mobile station and a third index representing an amount of data buffered in the mobile station and to be transmitted, sets a measurement period which is to be used for calculating an interference power to a first length when a period in which the transmission rate change is expected not to occur exceeds a certain period, while sets the measurement period to a second length shorter than the first length when the transmission rate change is expected to occur; an interference power measurement unit that calculates interference power by averaging power of interference wave over the measurement period; a received signal quality measurement unit that calculates signal quality of the radio signal received from the mobile station based on the radio signal power and the interference power; and a transmission power decision unit that decides a transmission power control value to the mobile station so as to cause the mobile station to increase the transmission value when the signal quality is lower than a target value, while decides the transmission power control value to the mobile station so as to cause the mobile station to decrease the transmission value when the signal quality is higher than the target value.

According to still another embodiment, a radio signal quality measurement method is provided. The radio signal quality measurement method includes: calculating a radio signal power of a radio signal received from an apparatus of radio communication destination; determining whether or not a transmission rate change of data transmitted from the apparatus of radio communication destination is expected to occur based on a first index representing a transmission rate of received data transmitted from the apparatus of radio communication destination and, one of a second index representing a resource assigned to the apparatus of radio communication destination and a third index representing an amount of data buffered in the apparatus of radio communication destination and to be transmitted, setting a measurement period which is to be used for calculating an interference power to a first length when a period in which the transmission rate change is expected not to occur exceeds a certain period, while setting the measurement period to a second length shorter than the first length when the transmission rate change is expected to occur; calculating an interference power by averaging power of interference wave over the measurement period; and calculating signal quality of the radio signal received from the mobile station based on the radio signal power and the interference power.

The purpose and advantage of the present invention are realized and achieved by elements especially indicated in the claims and combinations thereof.

It should be understood that both the general description described above and the detailed description which will be described later, provide examples for illustrative purposes and are not intended to limit the present invention.

BRIEF DESCRIPTION OF THE DRAWINGS

FIG. 7 is a flowchart illustrating another example of the data transmission rate change determination process.

FIG. 8A is a schematic diagram illustrating another example of time change of the E-TFCI value.

FIG. 8B is a schematic diagram illustrating an example of time change of a TEBS value.

DESCRIPTION OF EMBODIMENTS

A mobile communication system according to one embodiment will be described below, with reference to figures.

In this mobile communication system, a base station estimates whether or not a rapid electric power change may occur, based on an index which represents an amount of resource assigned to each mobile station connected by radio connection, a transmission rate of uplink signals received from the mobile station etc. When the base station determines that the rapid electric power change may occur, the base station sets a length of a measurement period, which is used for calculating an electric power value of an interference signal, to be shorter than a length of a measurement period in a situation where such electric power change does not occur. This enables the base station to adjust the length of the measurement period which is used for calculating the electric power value of the interference signal, before the rapid electric power change in a received radio signal actually occurs.

In this embodiment, each apparatus included in the mobile communication system complies with Enhanced UpLink (EUL), which is the telecommunications standard specified by Third Generation Partnership Project (3GPP) Release 6.

Figure 1:
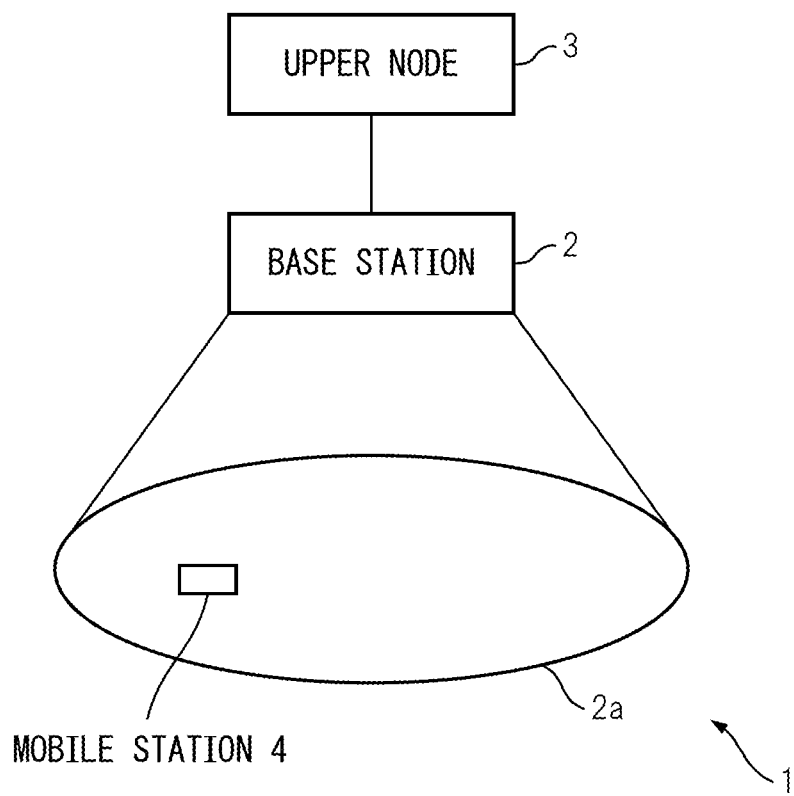
FIG. 1 is a schematic configuration diagram of a mobile communication system according to one embodiment.

FIG. 1 is a schematic configuration diagram of a mobile communication system according to one embodiment. The mobile communication system 1 includes the base station 2, an upper node 3 and the mobile station 4. The base station 2 is connected with the upper node 3 through a communication network. In FIG. 1, the mobile communication system 1 includes one base station and one mobile station, as an example. However, the number of base station and the number of mobile station, which are included in the mobile communication system 1, are not limited to one set.

The base station 2 relays communication between the mobile station 4 and the upper node 3.

The upper node 3 relays communication between the mobile station 4 and a core network. The upper node 3 is, for example, a radio network controller (RNC).

As an example, the mobile station 4 is a terminal, such as a cellular phone, which can communicate with other mobile stations through the base station 2.

The mobile station 4 entering into an area 2a of the base station 2, in which communication is available, enables the mobile station 4 to communicate by radio with the base station 2 which covers the area 2a in which communication is available. When the mobile station 4 is connected by radio with the base station 2, which can communicate with the mobile station 4 by radio, uplink data transmitted from the mobile station 4 is sent to the upper node 3 through the base station 2. In an example embodiment, the upper node 3 performs a routing to the received uplink data to transmit to another upper node (not illustrated) through the core network, for example. Moreover, the upper node 3 transmits downlink data, which is received through the core network from another upper node, to the mobile station 4 through the base station 2, which is connected by radio with the mobile station 4.

Figure 2:
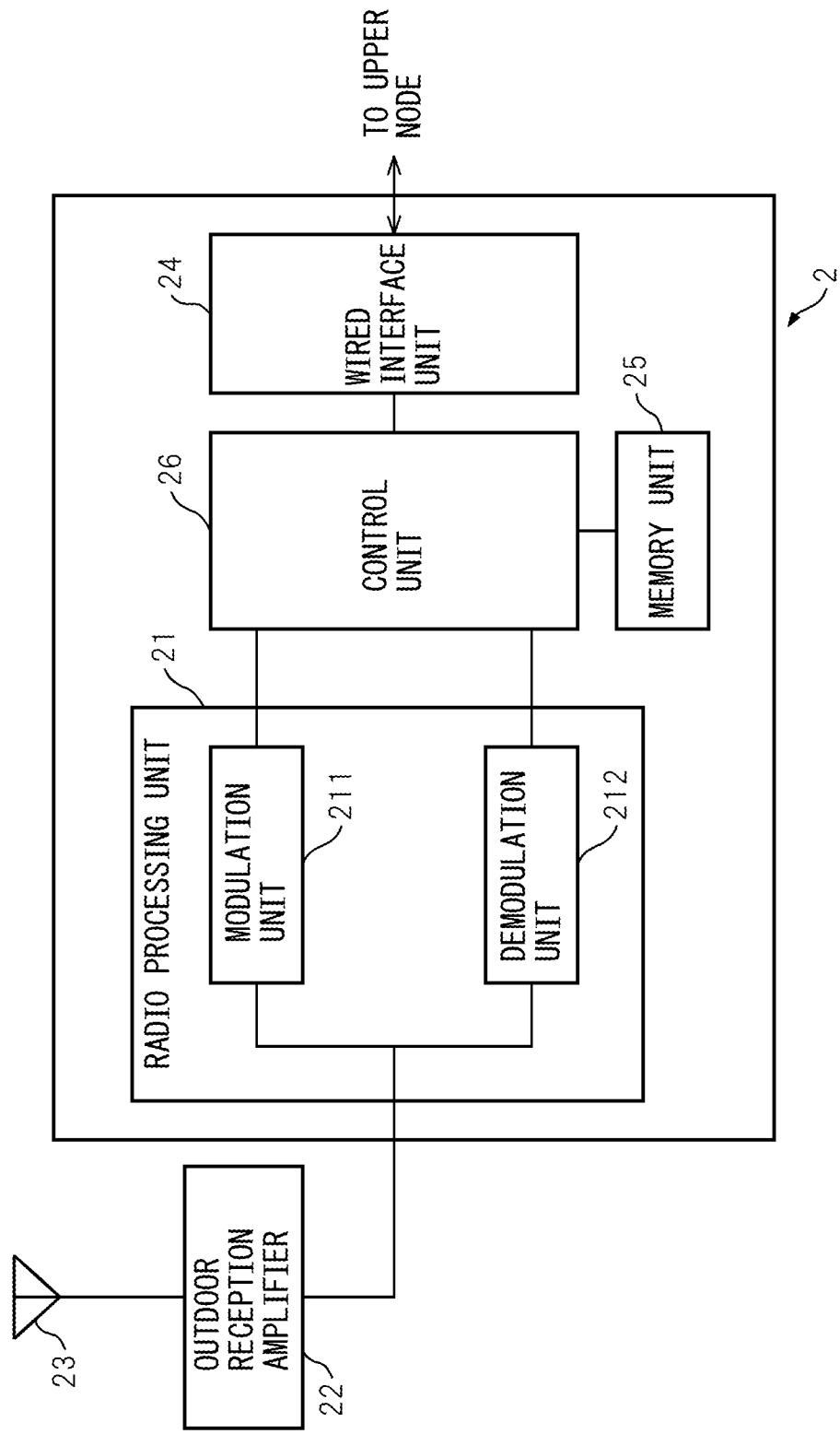
FIG. 2 is a schematic configuration diagram of a base station according to one embodiment.

FIG. 2 is a schematic configuration diagram of the base station 2.

In an example embodiment, the base station 2 includes a radio processing unit 21, an outdoor reception amplifier 22, an antenna 23, a wired interface unit 24, a memory unit 25 and a control unit 26. The radio processing unit 21 includes a modulation unit 211 and a demodulation unit 212. Among them, the radio processing part 21, the memory unit 25 and the control unit 26 are formed as separate circuits. Alternatively, these units may be implemented in the base station 2 as an integrated circuit on which circuits corresponding to those units are integrated.

The modulation unit 211 of the radio processing unit 21 modulates the downlink signal received from the control unit 26 according to a certain modulation method. For example, Quadrature Phase Shift Keying (QPSK) and 16 Quadrature Amplitude Modulation (16QAM) can be applied as the certain modulation method. The modulation unit 211 superimposes the modulated downlink signal on a carrier wave with a radio frequency. The modulation unit 211 transmits the downlink signal, which is superimposed on the carrier wave, to the antenna 23 through the outdoor reception amplifier 22.

The demodulation unit 212 of the radio processing unit 21 converts the frequency of the uplink signal from a radio frequency into a baseband frequency, by multiplying the uplink signal received from the antenna 23 through the outdoor reception amplifier 22 by a periodic signal which has intermediate frequency. The demodulation unit 212 demodulates the uplink signal according to the certain modulation method, and converts the uplink signal into a digital signal. Furthermore, the demodulation unit 212 executes an automatic gain control process so that the total electric power of the received radio signal is maintained constant. The demodulation unit 212 outputs the demodulated uplink signal to the control unit 26.

The antenna 23 radiates the downlink signal transmitted from the modulation unit 211 through the outdoor reception amplifier 22. Moreover, the antenna 23 receives the uplink signal transmitted from the mobile station 4, and transmits the uplink signal to the demodulation unit 212 through the outdoor reception amplifier 22.

The outdoor reception amplifier 22 amplifies the downlink signal, which is received from the modulation unit 211 and is superimposed on the carrier wave, so as to be a desired level by a high power amplifier (not illustrated), and sends the amplified signal to the antenna 23. Moreover, the outdoor reception amplifier 22 amplifies the uplink signal received through the antenna 23 by a low noise amplifier (not illustrated), and sends the amplified uplink signal to the demodulation unit 212.

The wired interface unit 24 includes a communication interface for connecting with the upper node 3. The wired interface unit 24 receives, from the upper node 3, the downlink signal or a control signal to the base station 2, and outputs the downlink signal or the control signal to the control unit 26. On the other hand, the wired interface unit 24 receives, from the control unit 26, the uplink signal or the control signal to the upper node 3, and outputs the uplink signal or the control signal to the upper node 3.

The memory unit 25 includes, for example, a rewritable nonvolatile semiconductor memory. The memory unit 25 stores various kinds of information used for the control for a radio connection with the mobile station 4, the information including identification information of the base station 2, operating frequency used therein, etc. Moreover, the memory unit 25 may store uplink data or downlink data temporarily.

The control unit 26 performs a process for transmitting to the mobile station 4 on the downlink data received from the upper node 3 through the wired interface unit 24. The control unit 26 extracts the uplink data from the uplink signal received from the mobile station 4, and outputs the uplink data to the wired interface unit 24.

Moreover, the control unit 26 performs processes, such as, for example, a call establishment and a call release. Furthermore, the control unit 26 performs processes, such as, for example, a measurement of the SIR estimation value of the received uplink signal and the transmission power control using the SIR estimation value. Therefore, as one embodiment, the control unit 26 functions as a radio signal quality measurement apparatus which obtains the SIR estimation value.

Figure 3:
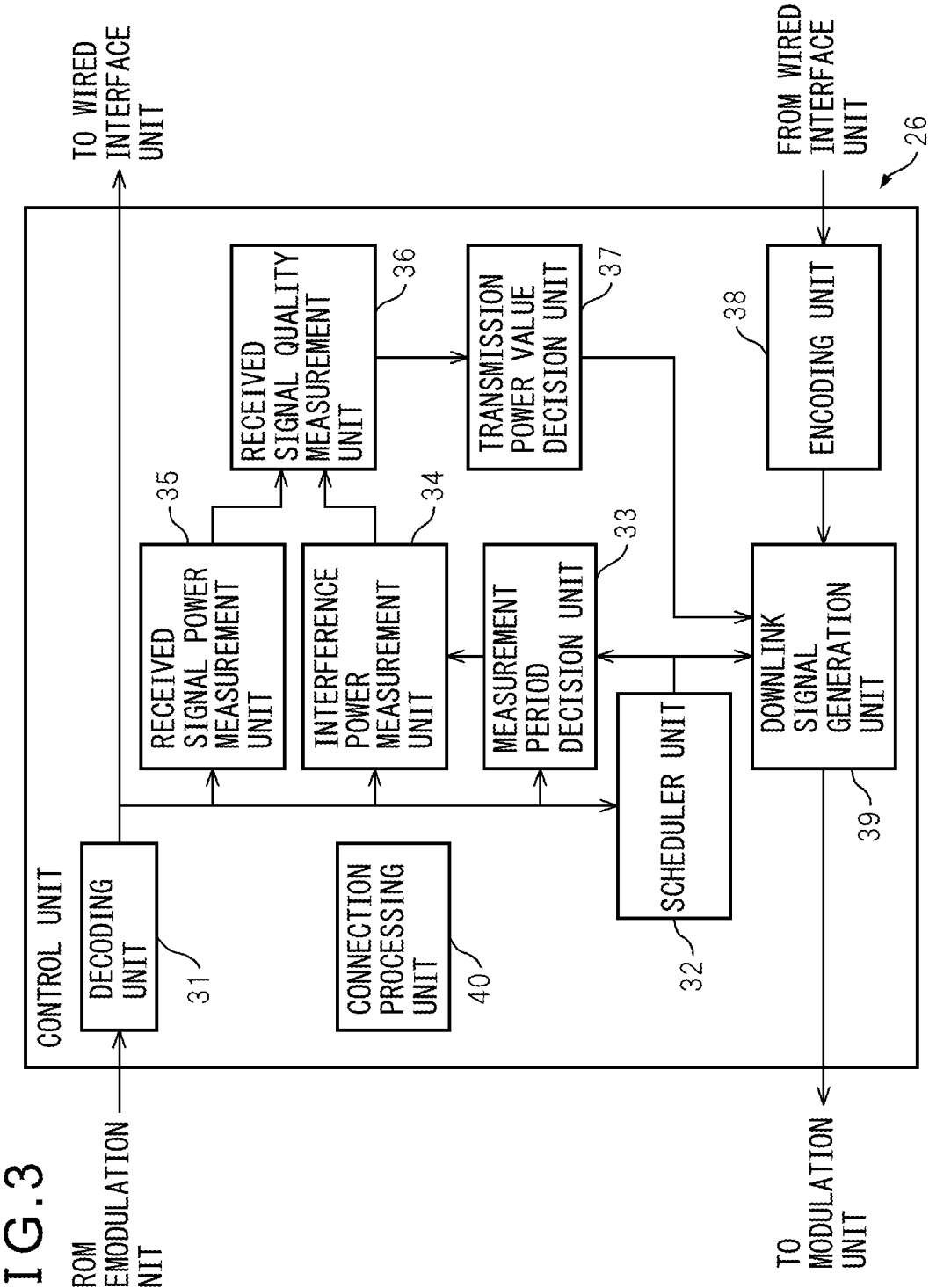
FIG. 3 is a block diagram of a control unit of the base station.

FIG. 3 is a block diagram of the control unit 26 for an example embodiment. The control unit 26 includes a decoding unit 31, a scheduler unit 32, a measurement period decision unit 33, an interference power measurement unit 34, a received signal power measurement unit 35, a received signal quality measurement unit 36, a transmission power value decision unit 37, an encoding unit 38, a downlink signals generation unit 39 and a connection processing unit 40. The control unit 26 includes, for example, one or more processors and a circumference circuit thereof, and performs processes in each unit illustrated in FIG. 3 by a program which operates on the processor.

The decoding unit 31 performs a decoding process on the uplink signal demodulated by the demodulation unit 212. For example, the decoding unit 31 reproduces the signal of each channel in uplink by performing, on an uplink signal, despreading, Rake combination, channel separation and an error correction decoding process. Furthermore, the decoding unit 31 performs a Hybrid Automatic Repeat Request (HARQ) compositing process to the signal of an enhanced dedicated physical data channel (E-Dedicated Physical Data Channel: E-DPDCH). In the process, the decoding unit 31 transmits decoded data signal to the wired interface unit 24 as an E-DCH data frame, in cases where the result of the cyclic redundancy check (CRC) in an error correction process is normal. On the other hand, in cases where the result of the CRC is unusual, the decoding unit 31 stores the received data into the memory unit 25. Then, the decoding unit 31 performs the decoding process again by combining (Incremental Redundancy with Chase Combining) the received data which is stored in the memory unit 25 with retransmitted data received after the storing. The decoding unit 31 notifies the downlink signals generation unit 39 of a CRC determination result as ACK/NACK information. The ACK/NACK information is mapped on E-DCH Hybrid ARQ Indicator Channel (E-HICH) in the downlink signals generation unit 39, and is transmitted to the mobile station 4.

The decoding unit 31 outputs the uplink data included in the uplink signal to the wired interface unit 24. The decoding unit 31 sends the pilot signal of UL-DPCCH to the interference power measurement unit 34 and the received signal measurement unit 35. Moreover, the decoding unit 31 notifies the scheduler unit 32 of the control information regarding E-DPDCH received through the enhanced dedicated physical control channel (E-Dedicated Physical Control Channel, E-DPCCH). The control information includes an E-DCH Transport Format Combination Indicator (E-TFCI), a retransmission sequence number (RSN), and a Happy bit, for example.

The E-TFCI value represents a transport format simultaneously transmitted over the E-DPDCH. As the E-TFCI value increases, a transmission rate of the data transmitted over the E-DPDCH becomes higher. Thus, the E-TFCI value is an index representing the transmission rate of the data transmitted to the base station 2 from the mobile station 4. Therefore, referring to the E-TFCI value allows the base station 2 to know the transmission rate of current data of the signal transmitted over the E-DPDCH. The RSN represents an HARQ sequence number of a transport block currently transmitted over the E-DPDCH. The Happy bit represents whether or not the mobile station 4 is satisfied with the transmission rate of the current data, or whether or not higher power can be assigned.

Furthermore, the decoding unit 31 detects Scheduling Information (SI) used for performing a scheduling of the signal to be transmitted through EUL from the control information received over the E-DPCCH and, notifies the scheduler unit 32 of the Scheduling Information. The Scheduling Information includes terminal information such as Total E-DCH Buffer Status (TEBS) and UE transmission power headroom (UPH). In this context, TEBS is an index representing an amount of the uplink data which is buffered in the mobile station 4.

The decoding unit 31 notifies the measurement period decision unit 33 of the E-TFCI value and the TEBS value.

Furthermore, the decoding unit 31 detects a downlink TPC value from UpLink-Dedicated Physical Control Channel (UL-DPCCH) and sends the downlink TPC value to the downlink signals generation unit 39.

The scheduler unit 32 controls schedule of each channel to be transmitted from the mobile station 4 to the base station 2. The scheduler unit 32 decides, for every data process, the amount of resources which can be assigned to the mobile station 4 connected by radio connection, based on usage of data processing resources in the base station 2, a state of radio communication and terminal information notified by SI. The scheduler unit 32 then determines a Scheduling Grant value which is an index of the amount of resources assigned to the data transmitted over E-DPDCH, based on the amount of resources which can be assigned. The scheduler unit 32 notifies the downlink signals generation unit 39 of the Scheduling Grant value. The downlink signals generation unit 39 maps the Scheduling Grant value on E-DCH Absolute Grant Channel (E-AGCH). The Scheduling Grant value is transmitted to the mobile station 4 over the E-AGCH. The mobile station 4 decides the transmission rate of the data to be transmitted by recognizing the amount of resources which can be used, that is the amount of data which can be transmitted, based on the Scheduling Grant value.

Moreover, the scheduler unit 32 notifies the measurement period decision unit 33 of the Scheduling Grant value.

The measurement period decision unit 33 determines whether or not a rapid change of the amount of data transmitted through EUL will occur, based on the E-TFCI value and, any of the TEBS value and the Scheduling Grant value. The measurement period decision unit 33 decides the measurement period used for calculating an average of interference signal according to the determination result. The measurement period decision unit 33 determines whether or not the transmission rate of the data transmitted through EUL may be changed rapidly in the near future, according to any one of the plurality of methods described below or a combination of the such methods.

A first method determines that the transmission rate of the data transmitted over the E-DPDCH may increase rapidly, in cases where current transmission rate represented by E-TFCI value is lower than a transmission rate corresponding to the amount of resource represented by the Scheduling Grant value and assigned to the mobile station 4.

Figure 4:
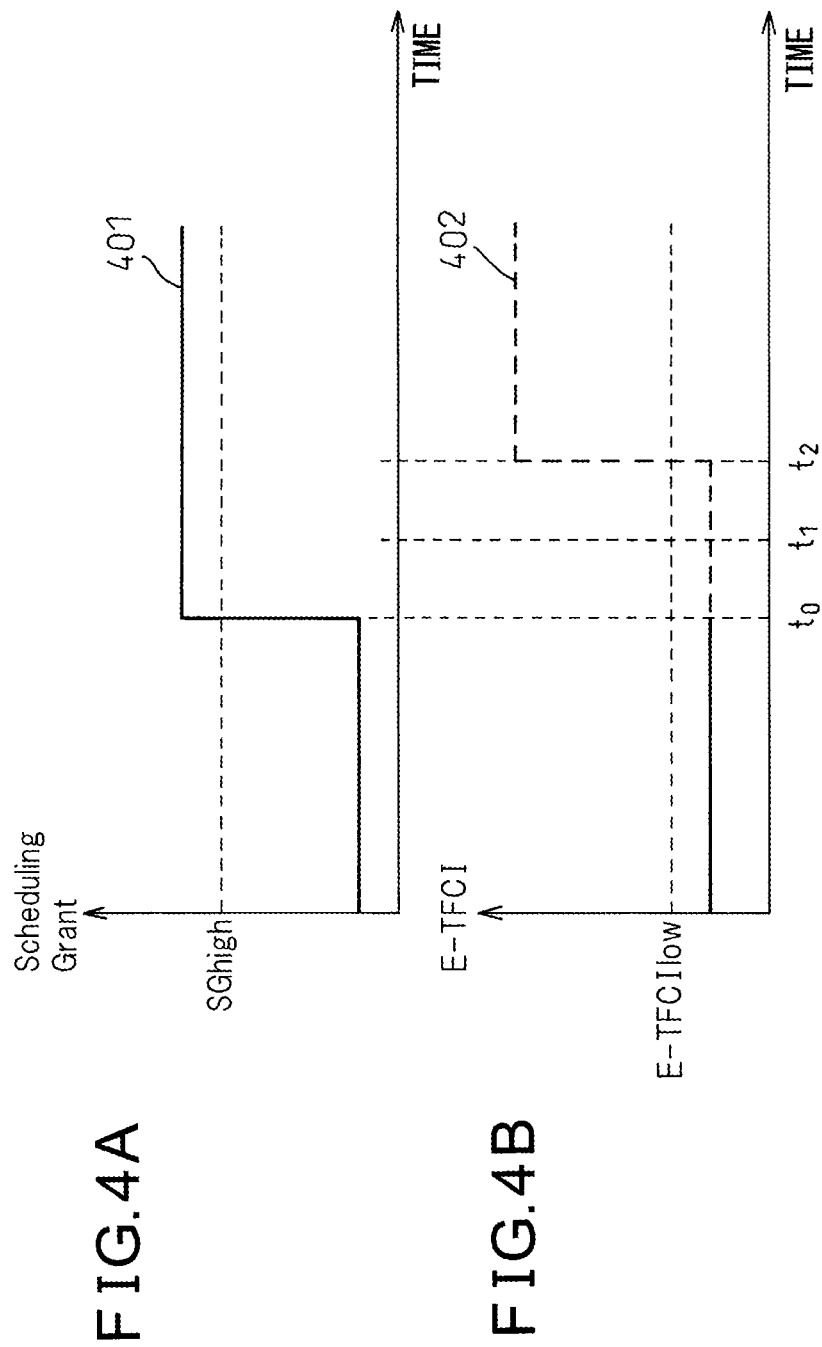
FIG. 4A is a schematic diagram illustrating an example of time change of a Scheduling Grant value.
FIG. 4B is a schematic diagram illustrating an example of time change of an E-TFCI value.

FIG. 4A and FIG. 4B are schematic diagrams illustrating examples of time changes of the Scheduling Grant value and the E-TFCI value respectively. In FIG. 4A and FIG. 4B, horizontal axes express time, respectively. Furthermore, in FIG. 4A, a vertical axis expresses a Scheduling Grant value and, a graph 401 illustrates time change of the Scheduling Grant value decided by the scheduler unit 32. On the other hand, in FIG. 4B, a vertical axis expresses the E-TFCI value and, a graph 402 illustrates time change of the E-TFCI value received from the mobile station 4.

Prior to the time $t_0$, the amount of resources assigned to the mobile station 4 is small, therefore both the Scheduling Grant value and the E-TFCI value are low. At the time $t_0$, it assumes that the scheduler unit 32 increases the amount of resources assigned to the mobile station 4, and as a result, the Scheduling Grant value becomes a value higher than a predetermined threshold value SGhigh. Hereinafter, the Scheduling Grant value decided at the time $t_0$ is referred to as SG (0). After that, at time $t_1$, SG (0) is transmitted to the mobile station 4 over the E-AGCH. On the other hand, the mobile station 4 confirms that, by receiving SG (0), the mobile station 4 can increase the data transmission rate. Thus, the mobile station 4 changes the data transmission rate into a value according to SG (0) after the time $t_1$. The E-TFCI value is also modified to be a value higher than a certain threshold value E-TFCI according to the changed data transmission rate. At time $t_2$, the amount of data transmitted over the E-DPDCH increases rapidly. After the time $t_2$, data is transmitted over the E-DPDCH with the changed data transmission rate and modified E-TFCI value. Thus, there is a time lag from the time $t_0$ at which the Scheduling Grant value is modified to the time $t_2$ at which the amount of data actually transmitted increases rapidly. Therefore, the base station 2 can estimate that there is a possibility that the amount of data transmitted may increase rapidly between the time $t_0$ and the time $t_2$.

Figure 5:
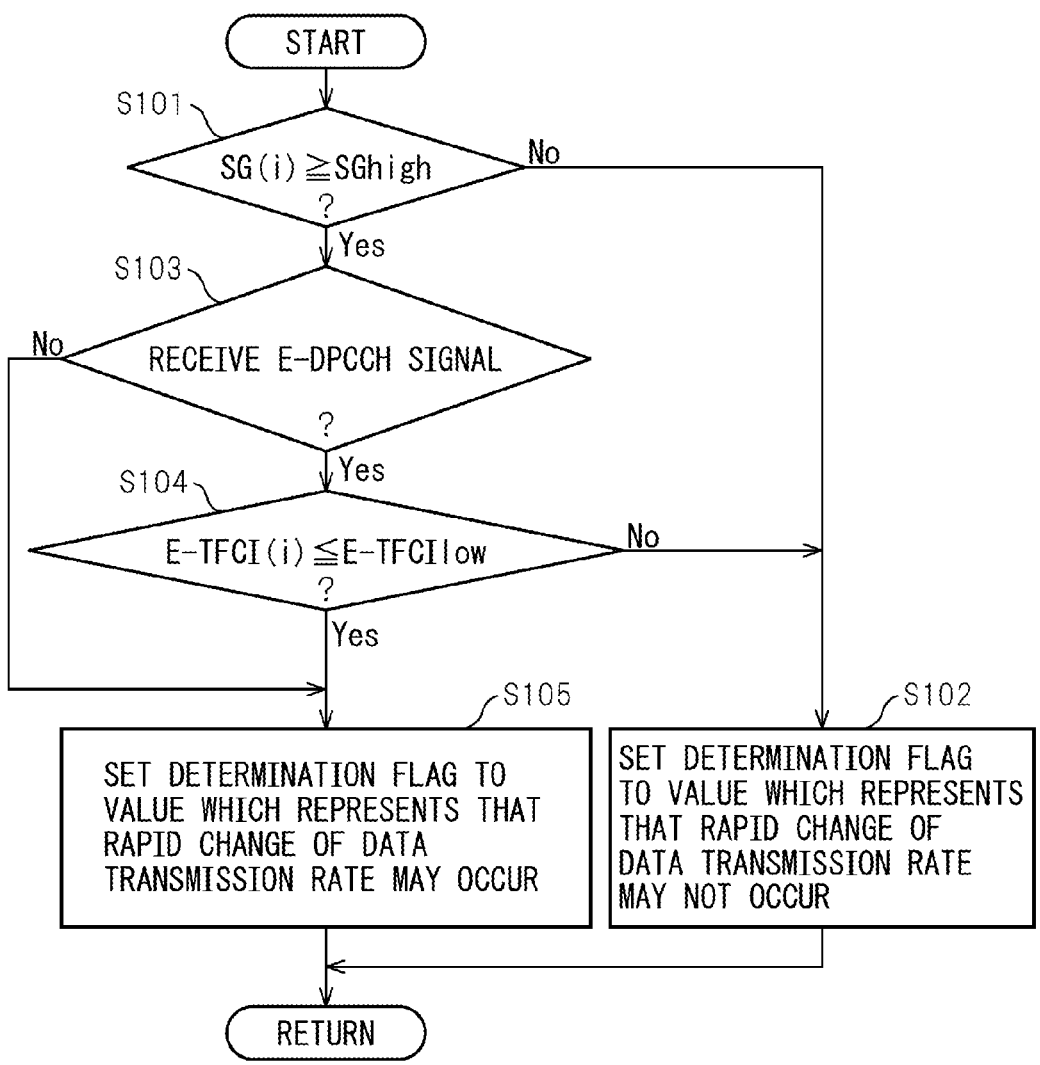
FIG. 5 is a flowchart illustrating an example of a data transmission rate change determination process.

FIG. 5 is a flowchart illustrating a data transmission rate change determination process according to the first method. The measurement period decision unit 33 performs the data transmission rate change determination process for every process using the EUL.

The measurement period decision unit 33 determines whether or not the Scheduling Grant value in current process i (hereinafter, referred to as SG(i)) is equal to or higher than the threshold value SGhigh (step S101). If SG(i) is lower than SGhigh (step S101—No), there are not many resources currently assigned to the mobile station 4. Therefore, the measurement period decision unit 33 determines that the amount of data transmitted through EUL may not increase rapidly. The measurement period decision unit 33 sets a determination flag which represents a data transmission rate change determination result to a value which represents a determination result that a rapid change of data transmission rate may not occur (step S102).

On the other hand, in cases where SG(i) is equal to or higher than SGhigh (step S101—Yes), the measurement period decision unit 33 determines whether or not the measurement period decision unit 33 is receiving a signal of the E-DPCCH from the mobile station 4 in the current process (step S103). If the E-TFCI value is not notified from the decoding unit 31, the measurement period decision unit 33 determines that the base station 2 is not receiving the E-DPCCH from the mobile station 4.

In cases where the signal of E-DPCCH is not being received from the mobile station 4 (step S103—No), in spite of not transmitting data through EUL in the current process, large resource is assigned to the mobile station 4. Therefore, the amount of data transmission through EUL may increase rapidly. Then, the measurement period decision unit 33 sets the determination flag to a value which represents a determination result that a rapid change of data transmission rate may occur (step S105).

In cases where the base station 2 is receiving the signal of the E-DPCCH from the mobile station 4 (step S103—Yes), the measurement period decision unit 33 determines whether or not the E-TFCI value in the process i (hereinafter, referred to as E-TFCI(i)) is equal to or lower than a certain threshold value E-TFCIlow (step S104). If E-TFCI(i) is higher than E-TFCIlow (step S104—No), the data transmission rate has already been a value according to SG(i), and thus, it is estimated that the rapid change of data transmission rate may not occur. Therefore, the measurement period decision unit 33 sets the determination flag to the value which represents the determination result that a rapid change of data transmission rate may not occur (step S102).

On the other hand, if E-TFCI(i) is lower than E-TFCIlow (step S104—Yes), the amount of data transmission is small even though a large amount of resources is assigned to the mobile station 4, thus it is estimated that a possibility that the rapid change of data transmission rate will occur is high. Then, the measurement period decision unit 33 sets the determination flag to the value which represents the determination result that a rapid change of data transmission rate may occur (step S105).

After the step S102 or the step S105, the measurement period decision unit 33 ends the data transmission rate change determination process according to the first method.

A second method determines that the transmission rate of the data transmitted over the E-DPDCH may decrease rapidly, in cases where current transmission rate represented by E-TFCI value is higher than a transmission rate corresponding to the amount of resource represented by the Scheduling Grant value and assigned to the mobile station 4.

Figures 6A, 6B:
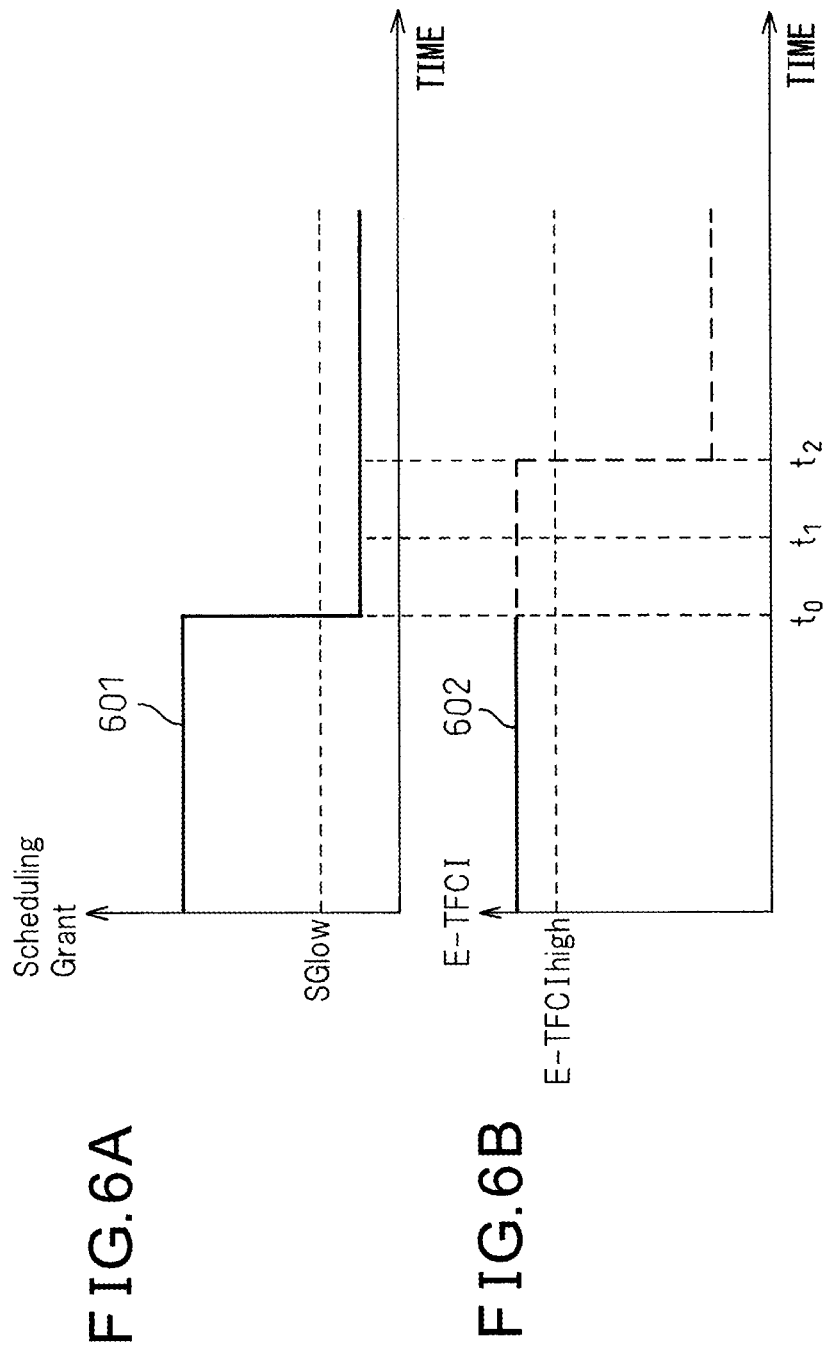
FIG. 6A is a schematic diagram illustrating another example of time change of the Scheduling Grant value.
FIG. 6B is a schematic diagram illustrating another example of time change of the E-TFCI value.

FIG. 6A and FIG. 6B are schematic diagrams illustrating examples of time changes of the Scheduling Grant value and the E-TFCI value respectively. In FIG. 6A and FIG. 6B, horizontal axes express time, respectively. Furthermore, in FIG. 6A, a vertical axis expresses a Scheduling Grant value and, a graph 601 illustrates time change of the Scheduling Grant value decided by the scheduler unit 32. On the other hand, in FIG. 6B, a vertical axis expresses the E-TFCI value and, a graph 602 illustrates time change of the E-TFCI value received from the mobile station 4.

Prior to the time $t_0$, the amount of resources assigned to the mobile station 4 is large, therefore both of the Scheduling Grant value and the E-TFCI value are high. At the time $t_0$, it assumes that the scheduler unit 32 decreases the amount of resources assigned to the mobile station 4, and as a result, the Scheduling Grant value becomes a value lower than a predetermined threshold value SGhigh. Hereinafter, the Scheduling Grant value decided at the time $t_0$ is referred to as SG (0). After that, at time $t_1$, SG (0) is transmitted to the mobile station 4 over the E-AGCH. On the other hand, the mobile station 4 confirms that, by receiving SG (0), the mobile station 4 preferably decreases the data transmission rate. Thus, the mobile station 4 changes the data transmission rate into a value according to SG (0) after the time $t_1$. The E-TFCI value is also modified to be a value lower than a certain threshold value E-TFCIhigh according to the changed data transmission rate. At time $t_2$, the amount of data transmitted over the E-DPDCH decreases rapidly. After the time $t_2$, data is transmitted over the E-DPDCH with the changed data transmission rate and modified E-TFCI value. Thus, there is a time lag from the time $t_0$ at which the Scheduling Grant value is modified to the time $t_2$ at which the amount of data actually transmitted decreases rapidly. Therefore, the base station 2 can estimate that the amount of data transmitted may decrease rapidly between the time $t_0$ and the time $t_2$.

FIG. 7 is a flowchart illustrating a data transmission rate change determination process according to the second method. The measurement period decision unit 33 performs the data transmission rate change determination process for every process using the EUL.

The measurement period decision unit 33 determines whether or not the Scheduling Grant value in current process i (hereinafter, referred to as SG(i)) is equal to or lower than the threshold value SGlow (step S201). If SG(i) is higher than SGlow (step S201—No), the measurement period decision unit 33 determines that the amount of data transmitted through EUL may not decrease rapidly. The measurement period decision unit 33 sets the determination flag to a value which represents a determination result that a rapid change of data transmission rate may not occur (step S202).

On the other hand, in cases where SG(i) is equal to or lower than SGlow (step S201—Yes), the measurement period decision unit 33 determines whether or not the measurement period decision unit 33 is receiving a signal of the E-DPCCH from the mobile station 4 in the current process (step S203).

In cases where the signal of E-DPCCH is not being received from the mobile station 4 (step S203—No), data is not transmitted through EUL in the current process. Therefore, the amount of data transmission through EUL may not decrease rapidly. Then, the measurement period decision unit 33 sets the determination flag to a value which represents a determination result that a rapid change of data transmission rate may not occur (step S202).

In cases where the base station 2 is receiving the signal of the E-DPCCH from the mobile station 4 (step S203—Yes), the measurement period decision unit 33 determines whether or not the E-TFCI value in the process i (hereinafter, referred to as E-TFCI(i)) is equal to or higher than a certain threshold value E-TFCIhigh (step S204). If E-TFCI(i) is lower than E-TFCIhigh (step S204—No), the data transmission rate has already been a value according to SG(i), and thus, it is estimated that the rapid change of data transmission rate may not occur. Therefore, the measurement period decision unit 33 sets the determination flag to the value which represents the determination result that a rapid change of data transmission rate may not occur (step S202).

On the other hand, if E-TFCI(i) is equal to or higher than E-TFCIhigh (step S204—Yes), the amount of data transmission is large even though a small amount of resource is assigned to the mobile station 4, and thus, it is estimated that a possibility the rapid change of data transmission rate has occurred is high. Then, the measurement period decision unit 33 sets the determination flag to the value which represents the determination result that a rapid change of data transmission rate may occur (step S205).

After the step S202 or the step S205, the measurement period decision unit 33 ends the data transmission rate change determination process according to the second method.

A third method determines that the transmission rate of the data transmitted over the E-DPDCH may decrease rapidly, in cases where current transmission rate represented by E-TFCI value is higher than a transmission rate corresponding to the amount of data buffered in the mobile station 4 and represented by the TEBS value.

FIG. 8A and FIG. 8B are schematic diagrams illustrating examples of time changes of the E-TFCI value and the TEBS value respectively. In FIG. 8A and FIG. 8B, horizontal axes express time, respectively. Furthermore, in FIG. 8A, a vertical axis expresses the E-TFCI value and, a graph 801 illustrates time change of the E-TFCI value received from the mobile station 4. On the other hand, in FIG. 8B, a vertical axis expresses the TEBS value and, a graph 802 illustrates time change of the TEBS value received from the mobile station 4.

Prior to the time $t_0$, the amount of resources assigned to the mobile station 4 is large, therefore, higher data transmission rate has been set. Moreover, the amount of data buffered in the mobile station 4 is large. Thus, both of the E-TFCI value and the TEBS value are high. After the time $t_0$, in the mobile station 4, it assumes that a generation rate of the uplink data which will be transmitted to the base station 2 has become smaller than the data transmission rate. For this reason, after the time $t_0$, the amount of data buffered in the mobile station 4 begins to decrease gradually. Therefore, the TEBS value notified to the base station 2 also becomes smaller gradually. It is assumed that data to be transmitted is estimated to disappear at a certain time after the time $t_0$, according to the amount of data buffered in the mobile station 4 and the data transmission rate currently set. In this case, the mobile station 4 reduces the data transmission rate at the time $t_1$ before a state where the data to be transmitted to the base station 2 disappears. Thus, at the time $t_1$, the amount of data transmitted over the E-DPDCH decreases rapidly. Moreover, the E-TFCI value notified to the base station 2 is set to a value lower than the E-TFCIhigh. After the time $t_1$, data is transmitted over the E-DPDCH with the changed data transmission rate and modified E-TFCI value. Thus, there is a time lag from the time $t_0$ at which the TEBS value begins to decrease to the time $t_1$ at which the amount of data actually transmitted decreases rapidly. Therefore, the base station 2 can estimate that the amount of data transmitted may decrease rapidly between the time $t_0$ and the time $t_1$.

Figure 9:
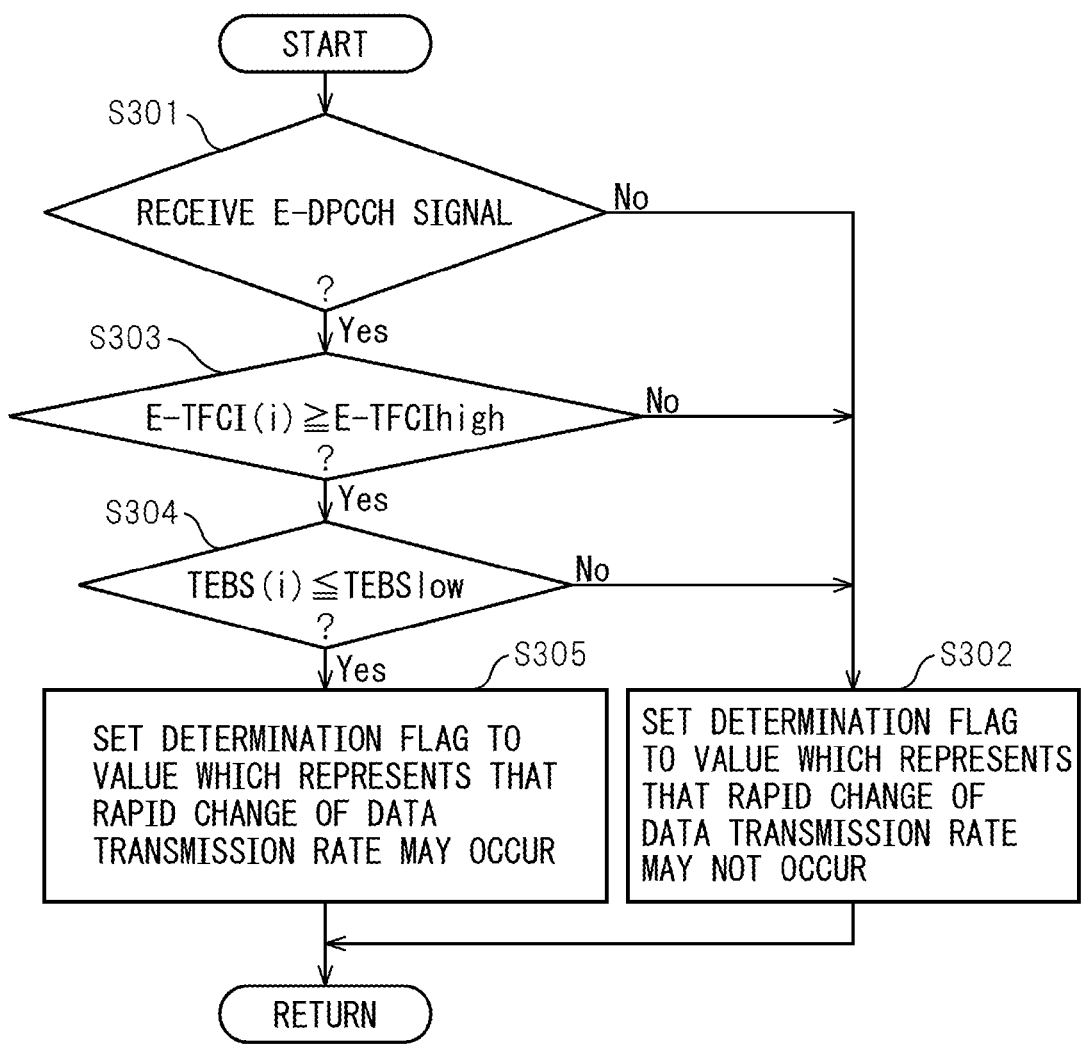
FIG. 9 is a flowchart illustrating a still another example of the data transmission rate change determination process.

FIG. 9 is a flowchart illustrating a data transmission rate change determination process according to the third method. The measurement period decision unit 33 performs the data transmission rate change determination process for every process using the EUL.

The measurement period decision unit 33 determines whether or not the measurement period decision unit 33 is receiving a signal of the E-DPCCH from the mobile station 4 in the current process (step S301). When the signal of E-DPCCH is not being received from the mobile station 4 (step S301—No), data is not transmitted through EUL in the current process. Therefore, the amount of data transmission through EUL may not increase rapidly. Then, the measurement period decision unit 33 sets the determination flag to a value which represents a determination result that a rapid change of data transmission rate may not occur (step S302).

On the other hand, in cases where the base station 2 is receiving the signal of the E-DPCCH from the mobile station 4 (step S301—Yes), the measurement period decision unit 33 determines whether or not the E-TFCI value in the process i (hereinafter, referred to as E-TFCI(i)) is equal to or higher than a certain threshold value E-TFCIhigh (step S303). If E-TFCI(i) is lower than E-TFCIhigh (step S303—No), the data transmission rate has already been a value according to a remaining amount of the buffer in the mobile station 4, thus it is estimated that the rapid change of data transmission rate may not occur. Therefore, the measurement period decision unit 33 sets the determination flag to the value which represents the determination result that a rapid change of data transmission rate may not occur (step S302).

On the other hand, if E-TFCI(i) is equal to or higher than E-TFCIhigh (step S303—Yes), the measurement period decision unit 33 determines whether the TEBS value in the process i (hereinafter, referred to as TEBS(i)) received from the mobile station 4 is equal to or lower than a certain threshold value TEBSlow (step S304). If TEBS(i) is higher than the threshold value TEBSlow (step S304—No), it is estimated that the amount of data buffered in the mobile station 4 is large enough not to need to reduce the current data transmission rate. Then, the measurement period decision unit 33 sets the determination flag to the value which represents the determination result that a rapid change of data transmission rate may not occur (step S302).

On the other hand, if TEBS(i) is equal to or lower the threshold value TEBSlow (step S304—Yes), it is estimated that the amount of data buffered in the mobile station 4 is small and the possibility that a rapid change of a data transmission rate will occur is high. Then, the measurement period decision unit 33 sets the determination flag to the value which represents the determination result that a rapid change of data transmission rate may occur (step S305).

After the step S302 or the step S305, the measurement period decision unit 33 ends the data transmission rate change determination process according to the third method.

In an example embodiments, each of the threshold values SGhigh, SGlow, E-TFCIhigh and E-TFCIlow is set to the Scheduling Grant value or the E-TFCI value when the data transmission rate from the mobile station 4 decreases or increases rapidly. In cases where EUL is used, the number of codes which are simultaneously transmitted and the spreading factor are changed discretely according to the amount of data transmitted from the mobile station 4 to the base station 2.

A table 1 illustrates an example of a relationship between the number of codes and, the spreading factor and transmission rate, which are used in E-DPDCH.

index 1 is twice the rate. Therefore, if the applied index switches from index 2 to index 1, the transmission power would increase rapidly. Then, for example, the threshold value E-TFCIhigh is taken as the minimum E-TFCI value among the values according to which index 1 is applied. The SGhigh is set to the minimum Scheduling Grant value among the values which enables a data reception in the transmission rate corresponding to such E-TFCI value.

Moreover, as compared with the transmission rate corresponding to index 3, the transmission rate corresponding to index 4 is half rate. Therefore, if the applied index switches from index 3 to index 4, transmission power would decrease rapidly. Then, for example, the threshold value E-TFCIlow is taken as the maximum E-TFCI value among the values according to which index 4 is applied. The SGlow is set to the minimum Scheduling Grant value among the values which enables a data reception in the transmission rate corresponding to such E-TFCI value.

TEBSlow can be set to the minimum amount of data among the amounts of data for which data transmission may not have been completed before elapsing time, in which case the base station 2 needs to perform a switching process of the measurement period, if the mobile station 4 transmits the uplink data currently buffered with the transmission rate corresponding to E-TFCIhigh.

The measurement period decision unit 33 decides the measurement period M with reference to the value of the determination flag determined by a change occurrence determination process of the above-mentioned data transmission rate.

TABLE 1

| Index | Number of Codes | Code #0 spreading factor | Code #0 Bit/Frame (10 ms) | Code #1 spreading factor | Code #1 Bit/Frame (10 ms) | Code #2 spreading factor | Code #2 Bit/Frame (10 ms) | Code #3 spreading factor | Code #3 Bit/Frame (10 ms) | Total Bit/Frame (10 ms) |
|---|---|---|---|---|---|---|---|---|---|---|
| 0 | 4 | 2 | 19200 | 2 | 19200 | 4 | 9600 | 4 | 9600 | 57600 |
| 1 | 2 | 2 | 19200 | 2 | 19200 | — | — | — | — | 38400 |
| 2 | 2 | 4 | 9600 | 4 | 9600 | — | — | — | — | 19200 |
| 3 | 1 | 4 | 9600 | — | — | — | — | — | — | 9600 |
| 4 | 1 | 8 | 4800 | — | — | — | — | — | — | 4800 |
| 5 | 1 | 16 | 2400 | — | — | — | — | — | — | 2400 |
| 6 | 1 | 32 | 1200 | — | — | — | — | — | — | 1200 |
| 7 | 1 | 64 | 600 | — | — | — | — | — | — | 600 |
| 8 | 1 | 128 | 300 | — | — | — | — | — | — | 300 |
| 9 | 1 | 256 | 150 | — | — | — | — | — | — | 150 |

As illustrated in the table 1, the number of codes and the spreading factor are set according to indexes 0 to 9.

In table 1, code#1 to code#4 are codes to be used, respectively. A corresponding transmission rate is illustrated in a column on the right of the spreading factor of each code, and a total transmission rate of each index is illustrated in a column on the right end. For example, in the index 0, the number of codes transmitted simultaneously are 4, and the spreading factor is 2 to code#0 and code#1, and is 4 to code#2 and code#3. The total transmission rate is 57,600 bits/frame.

As is clear from table 1, as the index value becomes smaller, the transmission rate of the data transmitted from the mobile station 4 becomes higher. Also, as the transmission rate becomes higher, the transmission power of the mobile station 4 becomes higher. A case where the transmission power value changes rapidly corresponds to a case where the applied index value is changed, i.e., a case where the number of codes or the spreading factor changes.

Figure 10:
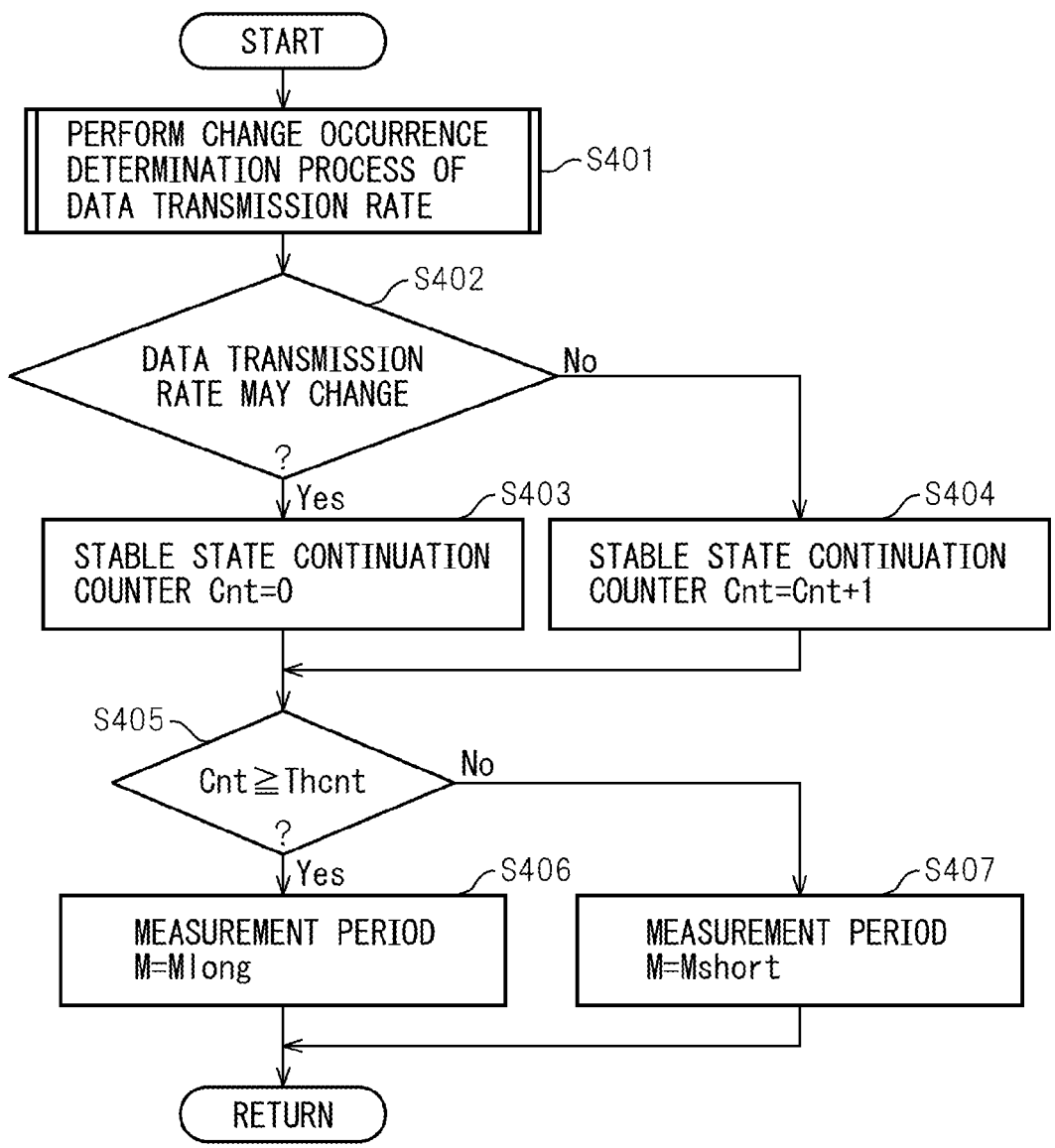
FIG. 10 is a flowchart of a measurement period determination process.

For example, as compared with the transmission rate corresponding to index 2, the transmission rate corresponding to FIG. 10 is a flowchart of a measurement period determination process. The measurement period decision unit 33 performs the measurement period determination process for every process using EUL.

First, the measurement period decision unit 33 performs the change occurrence determination process of the data transmission rate (step S401). Then, the measurement period decision unit 33 represents the determination result by the determination flag as mentioned above. The measurement period decision unit 33 performs any one of the first method to the third method which are mentioned above as the change occurrence determination process. Alternatively, the measurement period decision unit 33 may use at least two of the first method to the third method, which are mentioned above, as the change occurrence determination process. In cases where two or more methods are used, the measurement period decision unit 33 sets the value of the determination flag to the value representing that a rapid change of a data transmission rate may occur, when it is determined that the rapid change of the data transmission rate may occur in any one of the methods.

The measurement period decision unit 33 determines whether or not the data transmission rate may change, by referring to the value of the determination flag (step S402).

In cases where it is determined that the data transmission rate may change (step S402—Yes), the measurement period decision unit 33 sets the value of a stable state continuation counter Cnt to 0, the counter representing the number of processes during which the state where the data transmission rate is not rapidly changed continues (step S403).

On the other hand, in cases where it is determined that the data transmission rate may not change (step S402—No), the measurement period decision unit 33 increments the value of the stable state continuation counter Cnt by 1 (step S404). An initial value of the stable state continuation counter Cnt may be 0, or may be a value which is equal to or higher than the threshold value Thcnt mentioned below.

The measurement period decision unit 33 determines whether or not the stable state continuation counter Cnt is equal to or higher than the threshold value Thcnt (step S405). If the stable state continuation counter Cnt is equal to or higher than the threshold value Thcnt (step S405—Yes), the period during which the data transmission rate is not changed has continued more than a predetermined period. Therefore, the measurement period decision unit 33 sets a relatively long period Mlong as the measurement period M for calculating an average of an interference signal (step S406). The period Mlong is represented by, for example, a length of slot unit, and is used in cases where it is estimated that the time change of the received power of the radio signal in the base station 2 is small. For example, Mlong is 100 slots.

Moreover, the threshold value Thcnt is set to a value larger than Mlong. For example, in an EUL channel managing the process per two millisecond (three slots), Thcont is set 3 or more times Mlong.

On the other hand, if the stable state continuation counter Cnt is lower than the threshold value Thcnt (step S405—No), the data transmission rate may be changed rapidly, i.e., the received power in the base station 2 may be changed rapidly, or the data transmission rate is changing rapidly. In such case, the measurement period decision unit 33 sets the period Mshort shorter than Mlong as the measurement period M for calculating the interference signal (step S407). This period Mshort is represented by a length of slot unit, and is used in cases where it is estimated that the time change of the received power of the radio signal in the base station 2 is large. Therefore, Mshort is set to the maximum value among the values which satisfies the following condition, so that an error of the interference signal due to the time change of the received power of the radio signal can be suppressed.

$$Mshort < \frac{\Delta UE_{power}}{\Delta_{TPC}} \quad (1)$$

where $\Delta UE_{power}$ (dB) is for a permissible width of transmission power change in the mobile station 4 due to an abnormity of the SIR estimation value. $\Delta_{TPC}$ (dB) is for a power step width at each control timing of transmission power from the mobile station 4.

The measurement period decision unit 33 notifies the interference power measurement unit 34 of the decided measurement period M.

The interference power measurement unit 34 calculates the interference signal power based on the measurement period M decided by the measurement period decision unit 33 and the pilot symbols received from the decoding unit 31.

The interference power measurement unit 34 calculates the instantaneous interference signal power which is the power of the interference wave for each slot using a distribution of the pilot symbols in a slot, as the following equation.

$$Islot(k) = \frac{1}{Np} \sum_{n=0}^{Np-1} |r(n, k) \cdot \exp(-j\theta(n, k)) - rslot(k)|^2 \quad (2)$$

where, Islot(k) is for the instantaneous interference signal power in the slot k. r(n, k) is for a symbol after despreading the n-th pilot symbol included in the slot k. Since the automatic gain control is applied to the received signal as mentioned above, r(n, k) is expressed by an amplitude and a phase of voltage after applying the automatic gain control. That is, if the power correction coefficient in the time slot k decided by the automatic gain control is expressed as A(k), the absolute value R(n, k) of the n-th pilot symbol in the time slot k is equal to A(k)r(n, k). The power correction coefficient A(k) is proportional to a total radio signal power which the base station 2 receives in the time slot k. Therefore, r(n, k) becomes smaller as the total radio signal power which the base station 2 has received becomes larger. Moreover, as is clear from the equation (2), if Islot(k) is expressed using R(n, k), it is inversely proportional to a square of the power correction coefficient A(k). Thus, Islot(k) also becomes smaller as the total radio signal power which the base station 2 has received becomes larger. θ(n, k) is for a data modulation phase about the n-th pilot symbol of the slot k. Np is for the number of the pilot symbols included in the slot k. The rslot(k) is an average value of the pilot symbols in the slot k, and is calculated by the following equation.

$$rslot(k) = \frac{1}{Np} \sum_{n=0}^{Np-1} r(n, k) \cdot \exp(-j\theta(n, k)) \quad (3)$$

When the instantaneous interference signal power value of each slot has been calculated, the interference power measurement unit 34 calculates the averaged interference signal power value Iave(k) in the slot k by averaging the instantaneous interference signal power value of each slot according to the following equation.

$$Iave(k) = \frac{1}{M} \sum_{n=0}^{M-1} Islot(k - n) \quad (4)$$

where M is for the measurement period decided by the measurement period decision unit 33.

Alternatively, the interference power measurement unit 34 may average the instantaneous interference signal power value of each slot over the measurement period M by the following equation instead of using the equation (4), to calculate the averaged interference signal power value Iave(k).

$$Iave(k) = (1-\alpha)Iave(k-1) + \alpha \cdot Islot(k) \quad (5)$$

where α is for a forgetting factor. In this case, the forgetting factor α is set to smaller value, as the measurement period M is longer. For example, it is possible to set as α=1/M.

The interference power measurement unit 34 sends the averaged interference signal power value Iave(k) to the received signal quality measurement unit 36.

The received signal power measurement unit 35 calculates the signal power of the uplink signal received from a target mobile station (i.e., the mobile station 4 in the present embodiment) based on the pilot symbols received from the decoding unit 31.

The received signal power measurement unit 35 calculates the average value rslot(k) of the pilot symbol in the slot k according to equation (3). The received signal power measurement unit 35 calculates the received signal power value Sslot in the slot k by squaring the average value rslot(k) of the pilot symbols in the slot k, as expressed in the following equation.

$$Sslot(k)=|rslot(k)|^2 \quad (6)$$

As described above, if the power correction coefficient in the time slot k decided by the automatic gain control is expressed as $A(k)$, the absolute value $R(n, k)$ of the n-th pilot symbol in the time slot k is equal to $A(k)r(n, k)$. Therefore, if Sslot(k) is expressed using $R(n, k)$, it is inversely proportional to a square of the power correction coefficient $A(k)$. Thus, Sslot(k) also becomes smaller as the total radio signal power which the base station 2 has received becomes larger.

The received signal power measurement unit 35 sends the received signal power value Sslot(k) which is calculated to the received signal quality measurement unit 36.

The received signal quality measurement unit 36 calculates the SIR estimation value as quality of the uplink signal received from the mobile station 4, for example. The received signal quality measurement unit 36 calculates the SIR estimation value SIRmes(k) in the slot k according to the following equation.

$$SIRmes(k) = \frac{Sslot(k)}{Iave(k)} \quad (7)$$

The received signal quality measurement unit 36 sends the SIR estimation value SIRmes(k) to the transmission power value decision unit 37.

Alternatively, the received signal quality measurement unit 36 may calculate a signal-to-interference plus noise power ratio (SINR) as the quality of the uplink signal received from the mobile station 4, instead of calculating the SIR estimation value.

The transmission power value decision unit 37 decides the TPC value of uplink based on a comparison result for the SIR estimation value calculated by the received signal quality measurement unit 36 and the target SIR value.

Specifically, when the SIR estimation value is lower than the target SIR value, the transmission power value decision unit 37 sets the TPC value according to a communication standard with which the mobile communication system 1 complies, so that the transmission power of the mobile station 4 increases. On the other hand, in cases where the SIR estimation value is higher than the target SIR value, the transmission power value decision unit 37 sets the TPC value according to the communication standard with which the mobile communication system 1 complies, so that the transmission power of the mobile station 4 decreases. The target SIR value is set in advance based on a simulation or an experimental result, and is stored in the memory unit 25 of the base station 2.

The transmission power value decision unit 37 sends the decided TPC value of uplink to the downlink signals generation unit 39.

Figure 11:
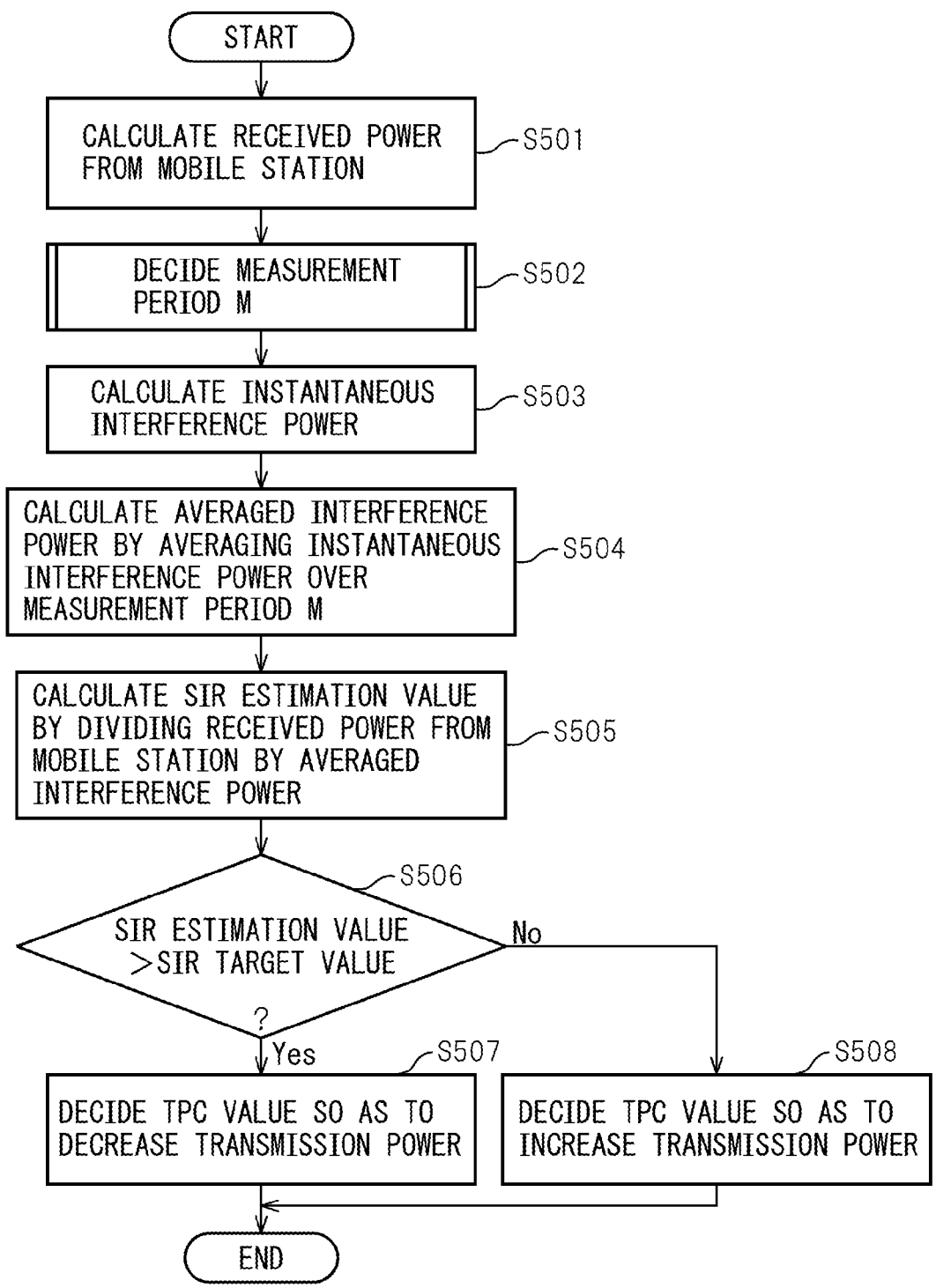
FIG. 11 is a flowchart of a transmission power determination process.

FIG. 11 is a flowchart of the transmission power determination process performed by the control unit 26 of the base station 2.

The received signal power measurement unit 35 calculates the received power from the mobile station 4 based on the pilot symbols included in the uplink signal from the mobile station 4, the uplink signal being received from the decoding unit 31 (step S501). Then, the received signal power measurement unit 35 notifies the received signal quality measurement unit 36 of the value of the received power. The measurement period decision unit 33 decides the measurement period M used for calculating an averaged interference signal (step S502). Thereafter, the measurement period decision unit 33 notifies the interference power measurement unit 34 of the measurement period M.

Moreover, the interference power measurement unit 34 calculates the instantaneous interference power which is interference power per slot, based on the pilot symbols detected by the decoding unit 31 (step S503). Thereafter, the interference power measurement unit 34 calculates an averaged interference power by averaging the instantaneous interference power of a plurality of slots over the measurement period M (step S504). The interference power measurement unit 34 notifies the received signal quality measurement unit 36 of the value of averaged interference power.

The received signal quality measurement unit 36 calculates the SIR estimation value about the uplink signal received from the mobile station 4 by dividing the received power from the mobile station 4 by the averaged interference power (step S505). The received signal quality measurement unit 36 notifies the transmission power value decision unit 37 of the SIR estimation value.

The transmission power value decision unit 37 determines whether or not the SIR estimation value is higher than the SIR target value (step S506).

In cases where the SIR estimation value is higher than the SIR target value, the transmission power value decision unit 37 decides the TPC value to cause the mobile station 4 to decrease the transmission power (step S507).

On the other hand, in cases where the SIR estimation value is lower than the SIR target value, the transmission power value decision unit 37 decides the TPC value to cause the mobile station 4 to increase the transmission power (step S508).

The transmission power value decision unit 37 sends the decided TPC value to the downlink signals generation unit 39. Subsequently, the control unit 26 ends the transmission power determination process.

It will be described regarding the effects of the improvement of estimate accuracy of the SIR estimation value according to the base station 2 in the present embodiment, with reference to the figures.

Figure 12A:
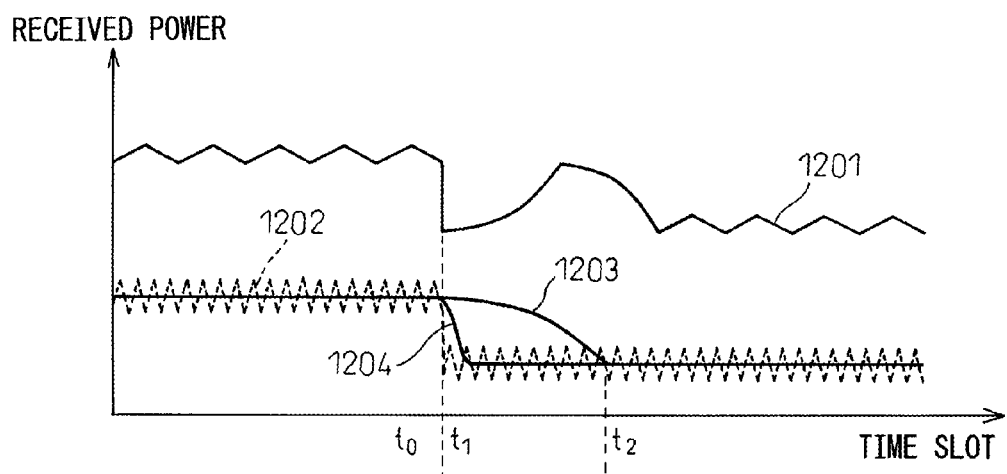
FIG. 12A is a figure illustrating time change of the received power and the interference power in the base station.
Figure 12B:
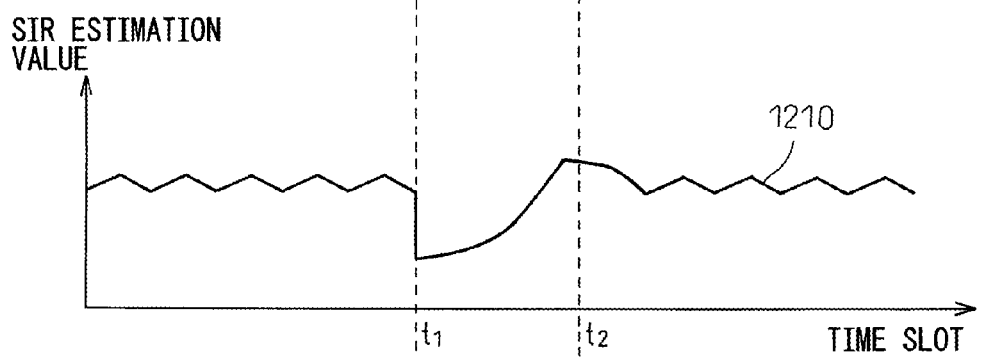
FIG. 12B is a figure illustrating time change of an SIR estimation value by a conventional technique.
Figure 12C:
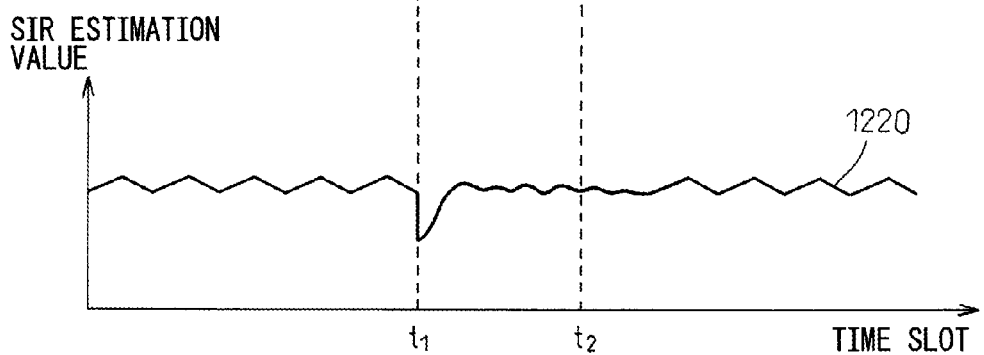
FIG. 12C is a figure illustrating time change of an SIR estimation value in the base station according to one embodiment.

FIG. 12A illustrates the time changes of the received power and the interference electric power in the base station 2, FIG. 12B illustrates the time change of the SIR estimation value according to a conventional technique and, FIG. 12C illustrates the time change of the SIR estimation value in the base station 2 according to the present embodiment. In FIG. 12A to FIG. 12C, horizontal axes express the time of slot unit. In FIG. 12A, a vertical axis expresses an electric power value. Moreover, in FIG. 12B and FIG. 12C, vertical axes express the SIR estimation values. In FIG. 12A, a graph 1201 with a solid line illustrates the time change of the received signal power from a subject mobile station. A graph 1202 with a dotted line illustrates the time change of the instantaneous interference power in each time slot. A graph 1203 with a solid line illustrates the time change of the averaged interference power calculated by averaging the instantaneous interference power along a time axis according to the conventional technique. A graph 1204 with a solid line illustrates the time change of the averaged interference power according to the present embodiment. In FIG. 12B, a graph 1210 illustrates the time change of the SIR estimation value according to the conventional technique. Moreover, in FIG. 12C, a graph 1220 illustrates the time change of the SIR estimation value according to the present embodiment.

Until the time $t_1$, the total power of the radio signals received by the base station 2 and the power of received signal from the mobile station 4 are substantially constant. Therefore, the averaged interference power is also substantially constant. It is assumed that, at the time $t_1$, the total power of the radio signals received by the base station 2 increases rapidly, due to an increase of the transmission rate of the uplink data received from the mobile station 4. In this case, in the base station 2, the automatic gain control is performed to the received signals, thus relative power of the signals received from respective mobile stations decreases rapidly. Therefore, as illustrated in the graphs 1201 and 1202, the power of received signal from the mobile station 4 and the instantaneous interference power also decrease rapidly. The averaged interference power is an average value of the instantaneous interference power obtained with respect to a plurality of time slots. Therefore, with the conventional technique, as illustrated in the graph 1203, the averaged interference power declines gradually from the time $t_1$ to the time $t_2$, the time $t_2$ being determined by elapsing time corresponding to the measurement period used for the calculation of the averaged interference power. Thus, with the conventional technique, though the actual SIR value is hardly changing around the time $t_1$, the SIR estimation value decreases rapidly in the time $t_1$, as illustrated in the graph 1210. Since a power control which causes the mobile station 4 to increase is performed, the power of signal transmitted from the mobile station 4 increases. However, the actual SIR value is hardly changing around the time $t_1$, therefore it is not necessary to increase the signal power transmitted from the mobile station 4. On the other hand, if the power of signal transmitted from the mobile station 4 increases, the power consumption in the mobile station 4 may increase and the SIR value to the signal received from other mobile station may decrease. Therefore, performing such transmission power control is not preferable.

On the other hand, in the base station 2 according to the present embodiment, the measurement period for calculating the averaged interference power value is changed into a shorter value at the time $t_0$ which is before the time $t_1$. Therefore, even if the total received power increases rapidly at the time $t_1$, the averaged interference power value also decreases within a shorter period in comparison with a case of the averaged interference power value calculated by the conventional technique, as illustrated in the graph 1204. Thus, as illustrated in the graph 1220, the amount of change of the SIR estimation value in the present embodiment is smaller than the amount of change of the SIR estimation value in the conventional technique. Therefore, according to the present embodiment, it is prevented from performing power control which causes the mobile station 4 to unnecessarily increase the transmission power value.

The encoding unit 38 performs a coding process, such as an error correction coding process and a spreading process, to the downlink data received from the upper node 3 through the wired interface unit 24. The encoding unit 38 sends the coded downlink data to the downlink signals generation unit 39.

The downlink signals generation unit 39 maps, on each channel, the coded downlink data and, the control information including the Scheduling Grant value received from the scheduler unit 32 and the TPC value of uplink received from the transmission power value decision unit 37. The downlink signals generation unit 39 generates downlink signals. Moreover, the downlink signals generation unit 29 updates a power value for the downlink signals based on the TPC value of downlink received from the decoding unit 31. The downlink signals generation unit 39 outputs the generated downlink signals to the modulation unit 212.

The connection processing unit 40 performs processes for connecting the mobile station 4 and the base station 2 by the radio connection, such as processes of position registration, hand-over, call establishment and call release.

Figure 13:
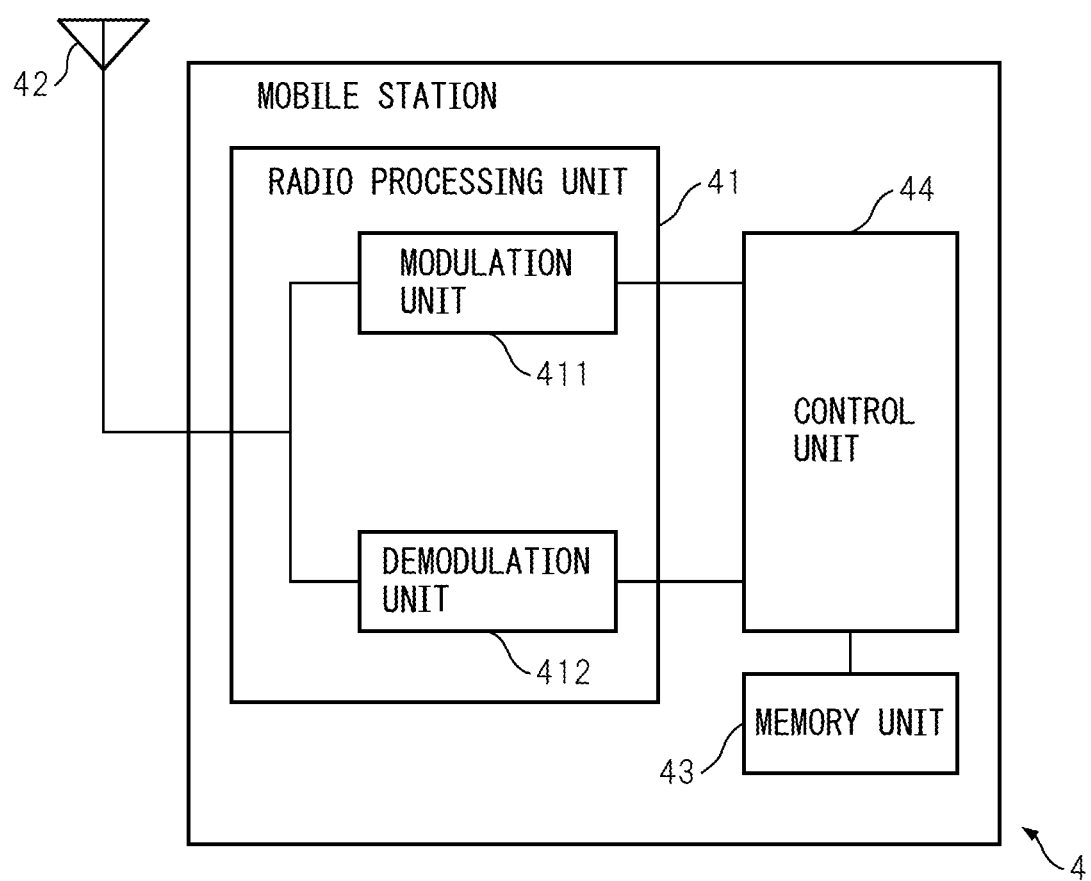
FIG. 13 is a schematic configuration diagram of a mobile station.

FIG. 13 is a schematic configuration diagram of the mobile station 4. In an example embodiment, the mobile station 4 includes a radio processing unit 41, an antenna 42, a memory unit 43, and a control unit 44. The radio processing unit 41 includes a modulation unit 411 and a demodulation unit 412. Among them, the radio processing unit 41, the memory unit 43 and the control unit 44 are formed as separate circuits respectively. Alternatively, these units may be implemented in the mobile station 4 in a form of an integrated circuit on which circuits corresponding to those units are integrated.

The radio processing unit 41 and the antenna 42 include the same function and constitution as the radio processing unit 21 and the antenna 23 of the base station 2 illustrated in FIG. 2, respectively. Therefore, the detailed explanation regarding the radio processing unit 41 and the antenna 42 will be omitted.

The memory unit 43 includes, for example, a rewritable nonvolatile semiconductor memory. The memory unit 43 stores various kinds of information used for the control to communicate with the base station 2.

The control unit 44 performs processes for connecting the mobile station 4 with the base station 2 by the radio connection, such as a process of position registration, a call control process and a hand-over process. In such processes, the control unit 44 generates a control signal for performing a process for the radio connection between the mobile station 4 and the base station 2 and, outputs the control signal to the modulation unit 411. Moreover, the control unit 44 performs a process according to the control signal received from the base station 2.

Moreover, the control unit 44 adds the E-TFCI value and the TEBS value into the control information of uplink. Furthermore, the control unit 44 adjusts the transmission power of the uplink signal output from the mobile station 4, according to the TPC value of uplink included in the control signal received from the base station 2.

Furthermore, the control unit 44 generates the uplink data including an audio signal or a data signal acquired through user interfaces (not illustrated), such as a microphone (not illustrated) or a keypad. The control unit 44 performs an information-source coding process to the uplink data. Moreover, the control unit 44 generates the uplink signals including the uplink data and the control signal and, performs, to the uplink signals, transmitting processes such as a coding process for error corrections, a channel multiplexing process and, a spreading process. The control unit 44 outputs the uplink signals applied the transmitting processes to the modulation unit 411. Moreover, the control unit 44 receives signals from the base station 2 which is connected by the radio connection, receives the downlink signals demodulated by the demodulation unit 412 and, performs, to the downlink signals, reception processes such as a despreading process, a channel separation process, an error correction decoding process, an information-source decoding process. The control unit 44 extracts the audio signal or the data signal from the decoded downlink signal. The control unit 44 reproduces the extracted audio signal with a speaker (not illustrated), or displays the extracted data signal on a display (not illustrated).

As explained above, according to this mobile communication system, the base station checks whether or not the transmission rate of the uplink data transmitted from the mobile station is a value corresponding to the amount of resource assigned to the mobile station or the amount of the uplink data buffered in the mobile station. If the transmission rate is not the value corresponding to the amount of the resource or the amount of the buffered uplink data, the base station predicts that the transmission rate of the data transmitted from the mobile station will be corrected in the near future and, the received power will change. The base station decides the measurement period used for averaging the interference power based on the prediction result. Therefore, the base station can predict an occurrence in the change of such received power before the actual rapid change of the received power and, can set the measurement period to a relatively short value. Accordingly, the base station can improve the estimation accuracy of the SIR estimation value, even if the received power changes rapidly.

In addition, a plurality of mobile stations may connect to the base station in one cell by the radio connections. In this case, if the base station determines that a shorter measurement period Mshort is to be applied according to above-described method of deciding the measurement period with respect to any one of the mobile stations connected by the radio connection, the base station may apply the shorter measurement period Mshort to other mobile stations. If the transmission rate of the data from either of a plurality of mobile stations to the base station, which are connected by the radio connection in same cell, changes rapidly, the total received power in the cell may also change rapidly. Therefore, the base station can improve the estimation accuracy of the SIR estimation value to the received signal from each mobile station connected by the radio connection in the same cell, by deciding the measurement period per cell.

In this case, the measurement period decision unit 33 included in the control unit 26 of the base station 2 may apply three data transmission rate change determination processes, each of which are described above, to each mobile station connected by the radio connection in the same cell. On the other hand, the measurement period decision unit 33 may classify respective mobile stations into two groups in advance according to the amount of resource assigned to the mobile stations. In this case, the measurement period decision unit 33 applies the first method illustrated in FIG. 5 and the third method illustrated in FIG. 9 to a group, in which the transmission rate may increase according to the amount of assigned resource or the transmission rate may decrease by decreasing the amount of data buffered in the mobile station. On the other hand, the measurement period decision unit 33 applies the second method illustrated in FIG. 7 and the third method illustrated in FIG. 9 to a group, in which the transmission rate may decrease according to a decrease in the amount of assigned resource or may decrease by decreasing the amount of data buffered in the mobile station. According to such processes, the measurement period decision unit 33 can reduce the number of the data transmission rate change determination processes performed to respective mobile stations thereby, reducing throughput for deciding the measurement period.

Figure 14:
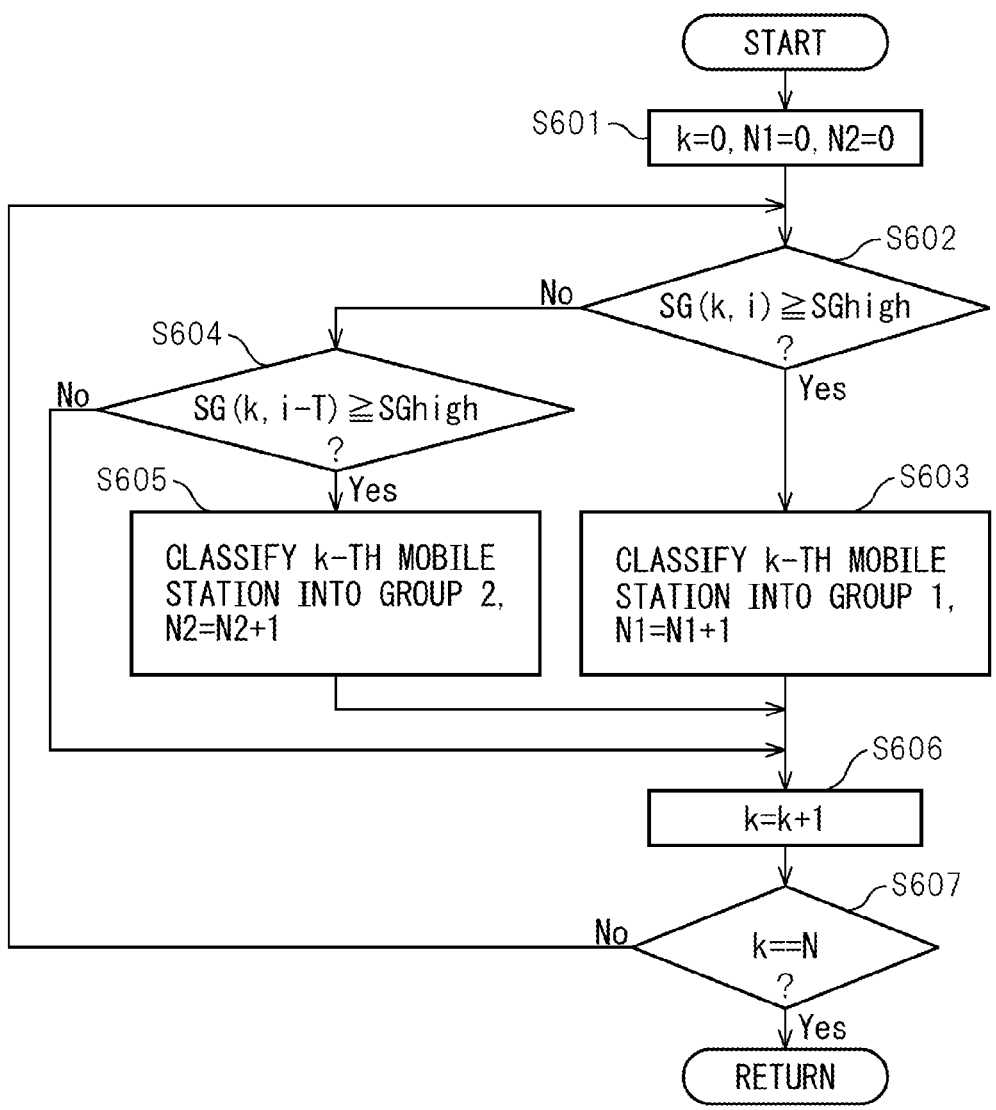
FIG. 14 is a flowchart of a classification process of the mobile station, which is performed by the base station according to another embodiment.

FIG. 14 is a flowchart of processes for classifying N number of mobile stations connected by the radio connections in the same cell (here, N is an integer larger than 1).

The processes for classifying the mobile stations are performed for every process by the measurement period decision unit 33 included in the control unit 26 of the base station 2.

First, the measurement period decision unit 33 initializes k representing the subject mobile station, the number N1 of the mobile stations included in the group 1 to which the methods 1 and 3 are applied, and the number N2 of the mobile stations included in the group 2 to which the methods 2 and 3 are applied, to 0 respectively (step S601). Next, the measurement period decision unit 33 determines whether or not the Scheduling Grant value SG (k, i) with respect to k-th mobile station is equal to or higher than the threshold value SGhigh (step S602). Besides, i is for a current process number.

In cases where SG (k, i) is higher than the threshold value SGhigh (step S602—Yes), the measurement period decision unit 33 classifies the k-th mobile station into the group 1 (step S603). The measurement period decision unit 33 stores an identification number of the k-th mobile station, SG (k, i), E-TFCI and TEBS with respect to the mobile station into a table 1 corresponding to the group 1 and, memorizes the table 1 to the memory unit 25. Moreover, the measurement period decision unit 33 increments the number N1 of the mobile station included in the group 1 by 1.

On the other hand, if SG (k, i) is lower than the threshold value SGhigh (step S602—No), the measurement period decision unit 33 determines whether or not the Scheduling Grant value SG (k, i-T) with respect to the k-th mobile station in the process (i-T) of T periods before the process i is equal to or higher than the threshold value SGhigh (step S604). For example, T is set to a certain period which is equal to or longer than a period from a timing at which the scheduler unit 32 of the base station 2 updates the Scheduling Grant value, to a timing at which the base station 2 receives the uplink signal transmitted with the data transmission rate corrected according to the Scheduling Grant value updated by the mobile station.

In cases where the Scheduling Grant value SG (k, i-T) is equal to or higher than the threshold value SGhigh (step S604—Yes), the resource currently assigned to the k-th mobile station has been less than the resource which was assigned T period ago. For that reason, the transmission rate of the data transmitted from the k-th mobile station may decrease rapidly. Therefore, the measurement period decision unit 33 classifies the k-th mobile station into the group 2 (step S605). The measurement period decision unit 33 stores the identification number of the k-th mobile station, SG (k, i), E-TFCI and TEBS with respect to the mobile station into a table 2 corresponding to the group 2 and, memorizes the table 2 to the memory unit 25. Moreover, the measurement period decision unit 33 increments the number N2 of the mobile station included in the group 2 by 1.

On the other hand, in cases where the Scheduling Grant value SG (k, i-T) is lower than the threshold value SGhigh (step S604—No), there are a few resources assigned to the k-th mobile station during a period from the process T period ago to the current process. For that reason, it is considered that the transmission rate of the data transmitted from the k-th mobile station may not change rapidly. Therefore, the measurement period decision unit 33 does not perform the data transmission rate change determination to the k-th mobile station. Thus, the measurement period decision unit 33 classifies the k-th mobile station into neither of the groups 1 and 2.

After the steps S603 or S605 or, in cases where the Scheduling Grant value SG (k, i-T) is lower than the threshold value SGhigh at the step S604, the measurement period decision unit 33 increments k by 1 (step S606). The measurement period decision unit 33 determines whether or not k is equal to N (step S607). If k is smaller than N (step S607—No), the measurement period decision unit 33 repeats the processes of the steps S602 to S607.

On the other hand, if k is equal to N (step S607—Yes), the measurement period decision unit 33 ends the processes for classifying the mobile stations.

Figure 15:
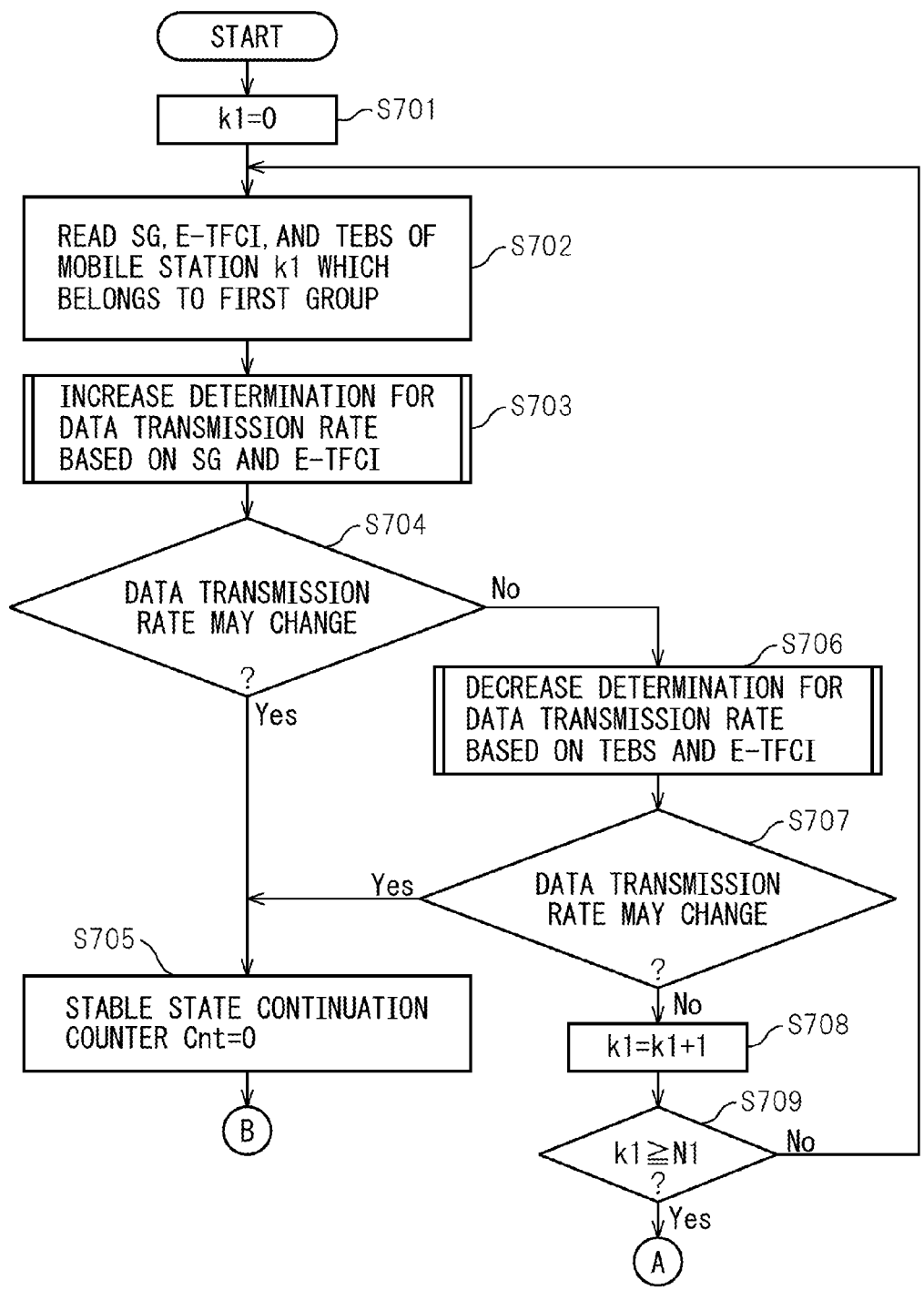
FIG. 15 is a flowchart of a measurement period determination process according to another embodiment.
Figure 16:
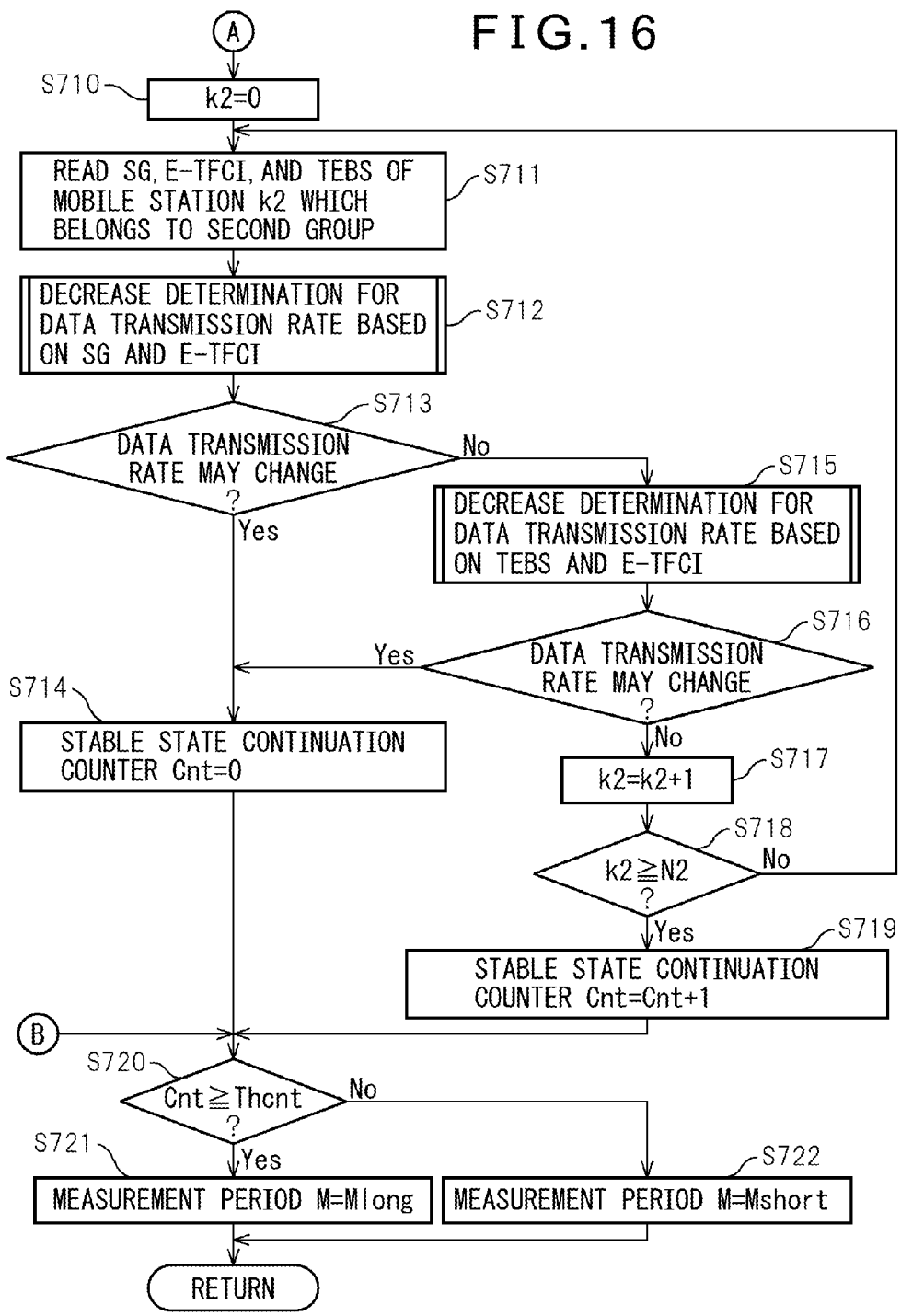
FIG. 16 is a flowchart of a measurement period determination process according to another embodiment.

FIG. 15 and FIG. 16 are flowcharts of a measurement period determination process to the grouped mobile stations.

The measurement period decision unit 33 sets the value of k1 representing the subject mobile station which belongs to a first group to 0 (step S701). The measurement period decision unit 33 reads SG, E-TFCI and TEBS of the mobile station k1 which belongs to the first group, by referring to the table 1 memorized in the memory unit 25 (step S702).

The measurement period decision unit 33 performs an increase determination process for the data transmission rate in accordance with the above-described first method based on SG and E-TFCI (step S703). The measurement period decision unit 33 refers to the determination flag obtained as a result of a first data transmission rate change determination process thereby, checking whether or not it is determined that the data transmission rate may change (step S704). In cases where it is determined that the data transmission rate may change (step S704—Yes), the measurement period decision unit 33 sets the value of the stable state continuation counter Cnt to 0 (step S705). The initial value of the stable state continuation counter Cnt may be 0, or may be a value more than the threshold value Thcnt.

On the other hand, in cases where it is determined that the data transmission rate may not change (step S704—No), the measurement period decision unit 33 performs a decrease determination process for the data transmission rate in accordance with the above-described third method based on TEBS and E-TFCI (step S706). The measurement period decision unit 33 refers to the determination flag obtained as a result of a third data transmission rate change determination process thereby, checking whether or not it is determined that the data transmission rate may change (step S707).

In cases where it is determined that the data transmission rate may change (step S707—Yes), the measurement period decision unit 33 sets the value of the stable state continuation counter Cnt to 0 (step S705).

On the other hand, in cases where it is determined that the data transmission rate may not change (step S704—No), the measurement period decision unit 33 increments k1 by 1 (step S708). The measurement period decision unit 33 determines whether or not k1 is equal to or larger than total number N1 of the mobile stations which belong to the group 1 (step S709). If k1 is smaller than N1 (step S709—No), the measurement period decision unit 33 repeats the processes of steps S702 to S709.

On the other hand, if k1 is equal to or larger than N1 (step S709—Yes), as illustrated in FIG. 16, the measurement period decision unit 33 sets the value k2 representing the subject mobile station which belongs to the second group to 0 (step S710). The measurement period decision unit 33 reads SG, E-TFCI and TEBS of the mobile station k2 which belongs to the second group, by referring to the table 2 memorized in the memory unit 25 (step S711).

The measurement period decision unit 33 performs the decrease determination process for the data transmission rate in accordance with the above-described second method based on SG and E-TFCI (step S712). The measurement period decision unit 33 refers to the determination flag obtained as a result of a second data transmission rate change determination process thereby, checking whether or not it is determined that the data transmission rate may change (step S713). In cases where it is determined that the data transmission rate may change (step S713—Yes), the measurement period decision unit 33 sets the value of the stable state continuation counter Cnt to 0 (step S714).

On the other hand, in cases where it is determined that the data transmission rate may not change (step S713—No), the measurement period decision unit 33 performs a decrease determination process for the data transmission rate in accordance with the above-described third method based on TEBS and E-TFCI (step S715). The measurement period decision unit 33 refers to the determination flag obtained as a result of the third data transmission rate change determination process thereby, checking whether or not it is determined that the data transmission rate may change (step S716).

In cases where it is determined that the data transmission rate may change (step S716—Yes), the measurement period decision unit 33 sets the value of the stable state continuation counter Cnt to 0 (step S714).

On the other hand, in cases where it is determined that the data transmission rate may not change (step S716—No), the measurement period decision unit 33 increments k2 by 1 (step S717). The measurement period decision unit 33 determines whether or not k2 is equal to or larger than total number N2 of the mobile stations which belong to the group 2 (step S718). If k2 is smaller than N2 (step S718—No), the measurement period decision unit 33 repeats the processes of steps S711 to S718.

On the other hand, in cases where k2 is equal to or larger than N2 (step S718—Yes), the measurement period decision unit 33 increments the stable state continuation counter Cnt by 1 (step S719). After the step S719 or, after the step S705 or S714, the measurement period decision unit 33 determines whether or not the value of stable state continuation counter Cnt is equal to or larger than the threshold value Thcnt (step S720). If the value of the stable state continuation counter Cnt is equal to or larger than the threshold value Thcnt (step S720—Yes), a state in which the transmission rate of the data transmitted from respective mobile stations connected by the radio connection in the same cell is not changed, has continued more than a certain period. Thus, the measurement period decision unit 33 sets a relatively longer period Mlong as the measurement period M for calculating the averaged interference signal (step S721).

On the other hand, if the value of the stable state continuation counter Cnt is smaller than the threshold value Thcnt (step S720—No), the transmission rate of the data transmitted from at least one of a plurality of mobile stations connected by the radio connections in the same cell may change rapidly, or is changing rapidly. Thus, the measurement period decision unit 33 sets the period Mshort shorter than Mlong as the measurement period M for calculating the interference signal (step S722).

After the step S721 or S722, the measurement period decision unit 33 ends the measurement period determination process. The measurement period decision unit 33 may perform the process of step S703 and the process of step S706 by switching the order of those processes. Similarly, the measurement period decision unit 33 may performs the process of step S712 and the process of step S715 by switching the order of those processes. Furthermore, the measurement period decision unit 33 may perform a process including steps S701 to S709 and a process including steps S710 to S718 by switching the order of the processes. Alternatively, the measurement period decision unit 33 may perform the process including steps S701 to S709 and the process including steps S710 to S718 in parallel. In this case, the measurement period decision unit 33 increments the value of the stable state continuation counter Cnt by 1, only in cases where it is determined that the k1 is equal to or larger than N1 in the step S709 and k2 is equal to or larger than N2 in step S718.

The interference power measurement unit 34 averages the instantaneous interference signal power value over the measurement period decided by the processes illustrated in FIG. 15 and FIG. 16 using the equation (4) or the equation (5) thereby, calculating the averaged interference signal power. The received signal quality measurement unit 36 divides the received signal power of respective mobile stations connected by the radio connections in the same cell by the averaged interference signal power respectively thereby, calculating the SIR estimation value to each mobile station.

The above-described mobile communication system, which includes the base station implemented the process of measuring the radio signal quality, may be a system in which the amount of assigned resource is notified from the base station to the mobile station and, an index representing the data transmission rate is notified from the mobile station to the base station. Therefore, according to another embodiment, the mobile communication system and, the base station and the mobile station which are included therein may comply with Long Term Evolution (LTE), for example.

According to still another embodiment, a communication device, which decides the resource assigned to an apparatus of communication destination and receives the index representing the transmission rate and the index of the amount of data buffered in the apparatus of communication destination to be transmitted, may include a function for calculating the SIR estimation value, the function being included in the control unit of the base station described above.

All examples and specific terms mentioned herein are intended for explaining and to understanding the present invention and the concept contributed by the inventors to promotion of the subject technology and, should not be interpreted as being limited to any examples in the present specification, specific example and condition, regarding the advantages and disadvantages of the present invention. Although the embodiments of the present invention are described in detail, it should be understood that it is possible to apply various changes, substitutions and corrections without departing from the spirit and scope of the present invention.

What is claimed is:

1. A base station comprising:
a received signal power measurement unit that calculates a radio signal power of a radio signal received from a mobile station which is connected by radio connection;
a measurement period decision unit that decides a measurement period which is to be used for calculating an interference power based on a first index representing a transmission rate of received data transmitted from the mobile station and one of a second index representing a resource assigned to the mobile station and a third index representing an amount of data buffered in the mobile station and to be transmitted;
an interference power measurement unit that calculates an interference power over the decided measurement period;
a received signal quality measurement unit that calculates signal quality of the radio signal received from the mobile station based on the radio signal power and the interference power; and
a transmission power decision unit that decides a transmission power control value to the mobile station based on the signal quality.

2. The base station according to claim 1, wherein the measurement period decision unit determines whether or not a transmission rate change is expected to occur, sets the measurement period to a first length when a period in which the transmission rate change is expected not to occur exceeds a certain period, while sets the measurement period to a second length shorter than the first length in a case of determining that the transmission rate change is expected to occur.

3. The base station according to claim 2, wherein
when the base station and a plurality of mobile stations are connected by radio connections in a same cell, the measurement period decision unit:
determines whether or not the transmission rate change is expected to occur for each of the plurality of mobile stations; and,
sets measurement periods for each of the plurality of mobile stations to the second length when any one of the plurality of mobile stations is determined that the transmission rate change is expected to occur.

4. The base station according to claim 3, wherein the measurement period decision unit:
classifies, among from the plurality of mobile stations, a mobile station to which a resource currently assigned is equal to or larger than a certain threshold into a first group and classifies other mobile station to which the resource currently assigned is smaller than the certain threshold and a resource assigned before a certain period is equal to or larger than the certain threshold into a second group differing from the first group;
determines that, with respect to each mobile station classified into the first group, the transmission rate change is expected to occur when the transmission rate represented by the first index is lower than a transmission rate corresponding to an amount of the resource represented by the second index; and
determines that, with respect to each mobile station classified into the second group, the transmission rate change is expected to occur when the transmission rate represented by the first index is higher than the transmission rate corresponding to the amount of the resource represented by the second index.

5. The base station according to claim 3, wherein the measurement period decision unit:
classifies, among from the plurality of mobile stations, a mobile station to which a resource currently assigned is equal to or larger than a certain threshold into a first group and classifies other mobile station to which the resource currently assigned is smaller than the certain threshold and a resource assigned before a certain period is equal to or larger than the certain threshold into a second group differing from the first group; and
determines that, with respect to each mobile station classified into the first group and each mobile station classified into the second group, the transmission rate change is expected to occur when the transmission rate represented by the first index is higher than a transmission rate corresponding to the amount of the data buffered in the apparatus of radio communication destination, the amount of data being represented by the third index.

6. The base station according to claim 1, wherein the transmission power decision unit decides the transmission power control value to the mobile station so as to cause the mobile station to increase the transmission value when the signal quality is lower than a target value, while decides the transmission power control value to the mobile station so as to cause the mobile station to decrease the transmission value when the signal quality is higher than the target value.

7. The base station according to claim 1, wherein the measurement period decision unit determines that the transmission rate change is expected to occur when the transmission rate represented by the first index is lower than a transmission rate corresponding to an amount of the resource represented by the second index.

8. The base station according to claim 1, wherein the measurement period decision unit determines that the transmission rate change is expected to occur when the transmission rate represented by the first index is higher than a transmission rate corresponding to an amount of the resource represented by the second index.

9. The base station according to claim 1, wherein the measurement period decision unit determines that the transmission rate change is expected to occur when the transmission rate represented by the first index is higher than a transmission rate corresponding to the amount of the data buffered in the mobile station, the amount of data being represented by the third index.

10. A mobile communication system comprising a mobile station and a base station, wherein
the base station comprises:
a received signal power measurement unit that calculates a radio signal power of a radio signal received from the mobile station which is connected by radio connection;
a measurement period decision unit that determines whether or not a transmission rate change is expected to occur based on a first index representing a transmission rate of received data transmitted from the mobile station and one of a second index representing a resource assigned to the mobile station and a third index representing an amount of data buffered in the mobile station and to be transmitted, sets a measurement period which is to be used for calculating an interference power to a first length when a period in which the transmission rate change is expected not to occur exceeds a certain period and sets the measurement period to a second length shorter than the first length when the transmission rate change is expected to occur;
an interference power measurement unit that calculates interference power by averaging power of interference wave over the measurement period;
a received signal quality measurement unit that calculates signal quality of the radio signal received from the mobile station based on the radio signal power and the interference power; and
a transmission power decision unit that decides a transmission power control value to the mobile station so as to cause the mobile station to increase the transmission value when the signal quality is lower than a target value and decides the transmission power control value to the mobile station so as to cause the mobile station to decrease the transmission value when the signal quality is higher than the target value.

11. A radio signal quality measurement method comprising:
calculating a radio signal power of a radio signal received from an apparatus of radio communication destination;
determining whether or not a transmission rate change is expected to occur based on a first index representing a transmission rate of received data transmitted from the apparatus of radio communication destination and, one of a second index representing a resource assigned to the apparatus of radio communication destination and a third index representing an amount of data buffered in the apparatus of radio communication destination and to be transmitted,
setting a measurement period which is to be used for calculating an interference power to a first length when a period in which the transmission rate change is expected not to occur exceeds a certain period, while setting the measurement period to a second length shorter than the first length when the transmission rate change is expected to occur;
calculating an interference power by averaging power of interference wave over the measurement period; and
calculating signal quality of the radio signal received from the mobile station based on the radio signal power and the interference power.

* * * * *